(12) United States Patent
Kitabayashi

(10) Patent No.: US 7,086,737 B2
(45) Date of Patent: Aug. 8, 2006

(54) OPTICAL APPARATUS, AND PROJECTOR

(75) Inventor: Masashi Kitabayashi, Horigane-mura (JP)

(73) Assignee: Seiko Epson Corporation, Tokyo (JP)

( * ) Notice: Subject to any disclaimer, the term of this patent is extended or adjusted under 35 U.S.C. 154(b) by 14 days.

(21) Appl. No.: 10/890,111

(22) Filed: Jul. 14, 2004

(65) Prior Publication Data
US 2005/0052619 A1 Mar. 10, 2005

(30) Foreign Application Priority Data
Jul. 15, 2003 (JP) ............................ 2003-197001

(51) Int. Cl.
G03B 21/00 (2006.01)
G03B 21/14 (2006.01)
G03B 21/22 (2006.01)
G03B 21/28 (2006.01)
G02F 1/1333 (2006.01)

(52) U.S. Cl. ..................... 353/31; 353/33; 353/81; 353/100; 353/119; 349/58

(58) Field of Classification Search ................. 353/31, 353/33, 81, 119, 121, 122, 100, 101; 349/58
See application file for complete search history.

(56) References Cited

U.S. PATENT DOCUMENTS 6,592,226 B1 * 7/2003 Fujimori ..................... 353/31

| 2005/0001985 A1* | 1/2005 | Kitabayashi ................. 353/31 |
| 2005/0018151 A1* | 1/2005 | Kitabayashi et al. ........ 353/119 |
| 2005/0146689 A1* | 7/2005 | Iechika et al. ................ 353/97 |
| 2005/0162621 A1* | 7/2005 | Shirota ........................ 353/81 |
| 2005/0179876 A1* | 8/2005 | Iinuma et al. ............... 353/119 |
| 2005/0185145 A1* | 8/2005 | Halsberghe et al. ........... 353/33 |

FOREIGN PATENT DOCUMENTS

| JP | 8-304739 | 11/1996 |
| JP | 2000-221558 | 8/2000 |
| JP | 2003-121931 | 4/2003 |

* cited by examiner

Primary Examiner—Melissa Jan Koval
(74) Attorney, Agent, or Firm—Oliff & Berridge, PLC

(57) ABSTRACT

To provide an optical apparatus, and a projector which can avoid the mutual positional deviations of a plurality of optical modulation devices and can form a good optical image free from pixel deviations. An optical apparatus includes three optical modulation devices which modulate respective color lights in accordance with image information, a cross dichroic prism which synthesizes the color lights modulated by the respective optical modulation devices, and pin spacers. Each of the optical modulation devices is fixed to the cross dichroic prism through the pin spacers. Each of the pin spacers is constructed of two pin-like protrusions, and a coupler which couples the two pin-like protrusions to each other at the parts of these pin-like protrusions as are remote from the end parts thereof on the side of the cross dichroic prism.

8 Claims, 9 Drawing Sheets

OPTICAL APPARATUS, AND PROJECTOR

BACKGROUND OF THE INVENTION

1. Field of Invention

The present invention relates to an optical apparatus, and a projector including a plurality of optical modulation devices which modulate a plurality of color lights in accordance with image information for the respective color lights; and a color synthesizing optical device which synthesizes the color lights modulated by the optical modulation devices and then emits the synthesized light, that are unitarily disposed.

2. Description of Related Art

A related art three-plate type projector includes a color separating optical system which separates a light beam emitted from a light source into color lights in three colors, three optical modulation devices which modulate the respective color lights in accordance with image information, and a color synthesizing optical device which synthesizes the light beams modulated by the respective optical modulation devices.

In such a three-plate type projector, the three optical modulation devices are joined and fixed to the color synthesizing optical device, as stated below, in order to reduce the size of the projector.

A related art optical apparatus, includes for example, a structure having three optical modulation devices that are joined and fixed to a color synthesizing optical device through a plurality of pin spacers. See JP-A-2000-221588.

Each of the optical modulation devices is constructed of an optical modulation element which performs optical modulation, and a holding frame which has an opening in correspondence with an image forming region of the optical modulation element and which houses the optical modulation element therein. Here, a holding frame is formed with four holes in the peripheral edge of the opening. Where the optical modulation element is housed and held in the holding frame, the four pin spacers are respectively inserted through the four holes formed in the holding frame, and the end surfaces of the pin spacers are bonded and fixed to the light-beam incident end surface of a color synthesizing optical device. The side surfaces of the pin spacers and the inner side surfaces of the holes are bonded and fixed, whereby the optical modulation device and the color synthesizing optical device are joined and fixed.

JP-A-2003-121931 discloses, for example, an optical apparatus where the plurality of pin spacers stated above are made unitary.

The optical apparatus includes a holding member which is substantially in the shape of a rectangular plate and which holds a corresponding optical modulation device, and four pins protrude from the surface of the plate outwards of the surface, at the four corner parts of the holding member. In the holding member, the plate surface which couples the four pins is bonded and fixed to the side surface of either of bases mounted on the upper and lower end surfaces of a color synthesizing optical device, or to the end surface of the color synthesizing optical device on the light-beam incident side thereof. In joining and fixing the optical modulation device to the color synthesizing optical device, in a state where the holding member is set on the side surface of the base or the light-beam incident side end surface of the color synthesizing optical device, the optical modulation device is set on the holding member so as to insert the four pins of the holding member through the four holes of the holding frame constituting the optical modulation device. The side surfaces of the four pins and the inner side surfaces of the four holes of the holding frame are bonded and fixed.

SUMMARY OF THE INVENTION

A related art structure has a holding frame which constitutes the optical modulation device that is formed by plate work or the like in order to efficiently radiate heat generated in the optical modulation element and to reduce the manufacturing cost of the optical modulation device.

However, in a case where the optical modulation device stated above is adopted for the optical apparatus described in JP-A-2000-221588, the holding frame thins, so that the bonding area between the side surface of each pin spacer and the inner side surface of the corresponding hole formed in the holding frame cannot be secured. Also the pin spacer is joined in a state where it is inclined by its own weight, in the manufacture of the optical apparatus. As the projector is used for a long term, differences in the magnitudes of thermal expansion arise due to differences in the quantities of an adhesive used to bond the inclined and joined pin spacers. Also the mutual positions of the three optical modulation devices fixed to the color synthesizing optical device might deviate, resulting in the pixel deviations of a projection image.

In a case where the optical modulation device stated above is adopted for the optical apparatus described in JP-A-2003-121931, the inclinations of the four pins are avoidable because the four pins are coupled to the plate member.

Since, however, the plate surface of the holding member is bonded and fixed to the side surface of the base or the light-beam incident side end surface of the color synthesizing optical device, the bonding area between the constituents of the holding member and the base, or the holding member and the color synthesizing optical device becomes large. Therefore, in case of a construction in which the coefficients of thermal expansion of these constituents are different, the thermal stress between the constituents becomes intense, and it becomes difficult to favorably keep the mutual positions of the three optical modulation devices fixed to the color synthesizing optical device.

An exemplary aspect of the present invention provides an optical apparatus, and a projector which can avoid the mutual positional deviations among a plurality of optical modulation devices and can form a good optical image free from pixel deviations.

The optical apparatus of an exemplary aspect of the present invention includes a plurality of optical modulation devices which modulate a plurality of color lights in accordance with image information for the respective color lights, and a color synthesizing optical device which synthesizes the color lights modulated by the optical modulation devices and then emits the synthesized light, that are unitarily disposed. Each of the optical modulation devices includes an optical modulation element which performs optical modulation, and a holding frame which has an opening corresponding to an image forming region of the optical modulation device, and a plurality of holes provided in a peripheral edge of the opening, and which houses the optical modulation device. The optical apparatus includes a plurality of pins which correspond to the plurality of holes, and through which are inserted through the plurality of holes, and through which the optical modulation device and the color synthesizing optical device are unitarily constructed. At least two of the plurality of pins are coupled to each other at their parts which are remote from ends located on a side of the color synthesizing optical device.

Here, the holes of the holding frame may be formed in a number of at least two, and their number and formation positions are not especially restricted. The pins may be provided in correspondence with the number of the holes of the holding frame.

The plurality of pins may have at least two of them coupled to each other, and three or more of them may be coupled to one another.

Further, at least two of the pins may be coupled at any position to respective pins except a construction in which the end parts of respective pins on the side of the color synthesizing optical device are coupled to each other.

Still further, one end of each of the plurality of pins may be directly joined to, for example, the light-beam incident end surface of the color synthesizing optical device, or it may be joined to another member which is fixed to the color synthesizing optical device.

According to an exemplary aspect of the present invention, the optical apparatus includes the plurality of pins, at least two of which are coupled to each other. Therefore, even in a case where the holding frame becomes too thin to secure the bonding area between the side surface of each pin and the inner side surface of the corresponding hole formed in the holding frame, the inclination of each pin attributed to it's own weight of the pin is avoidable when the construction is compared with a construction wherein a plurality of pins are made separate members as in the prior art.

The coupling portion, for at least two of the pins, couples the pins to each other at those parts of the pins which are remote from end parts which are located on the side of the color synthesizing optical device, so that one end of each of the pins to support the optical modulation device is bonded and fixed to, for example, the light-beam incident side end surface of the color synthesizing optical device. Therefore, when the construction is compared with a construction wherein, in a holding member to support an optical modulation device as in the related art, a plate surface which is a coupling portion to which a plurality of pins is bonded and fixed to, e.g., the light-beam incident side end surface of a color synthesizing optical device, influence which is exerted on each pin by thermal stress developing between the constituents becomes small, and the positional deviation of each pin is avoidable. This is true even where the bonding area between each pin to support the optical modulation device and the color synthesizing optical device or the like becomes small, and where the coefficients of thermal expansion of each pin and the color synthesizing optical device or the like are different.

Accordingly, since the inclinations and the positional deviations of the pins are avoided, the optical apparatus of the above construction can avoid the positional deviations of the plurality of optical modulation devices among them and can form a good optical image free from pixel deviations.

Since at least two of the pins are coupled to each other, the pins are easily inserted through the holes of the holding frame in the optical modulation device. The optical apparatus can be manufactured with ease when the construction is compared with a related art construction where the plurality of pins made as separate members.

In the optical apparatus of an exemplary aspect of the present invention, at least two of the pins may be coupled to each other on a light-beam incident side of the optical modulation device.

According to an exemplary aspect of the present invention, the coupling portion for at least two of the pins lies on the light-beam incident side of the optical modulation device, so that in joining the optical modulation device to the color synthesizing optical device through the pins, the coupling portion is pressed onto the side of the color synthesizing optical device, whereby one end of each pin can be reliably joined to, for example, the light-beam incident side end surface of the color synthesizing optical device. Accordingly, the joined state of the color synthesizing optical device and the optical modulation device can be brought into an appropriate state.

In the optical apparatus of an exemplary aspect of the present invention, an optical conversion element which converts optical characteristics of incident light may well be attached to a coupling portion for at least two of the pins.

Here, a polarizer plate, a phase difference plate, a color compensation plate, or a view-angle compensation plate, for example, can be adopted as the optical conversion element.

According to an exemplary aspect of the present invention, when an incident side polarizer plate, which for example, is arranged at the preceding stage of the optical path of the optical modulation device, is attached to the coupling portion for at least two of the pins, further reduction in the size of the optical apparatus can be attained.

In the optical apparatus of an exemplary aspect of the present invention, the coupling portion for at least two of the pins may extend along a flow path of cooling air which is sent to the optical apparatus.

According to an exemplary aspect of the present invention, owing to construction in which the coupling portion for at least two of the pins extends along the flow path of the cooling air which is sent to the optical apparatus, the flow of the cooling air is not hindered by the coupling portion. The coupling portion functions as a guide portion for the cooling air. Accordingly, air warmed by heat generated in the optical apparatus does not stay in the vicinity of the optical apparatus, and fresh cooling air is always sent to the optical apparatus, so that the cooling efficiency of the optical apparatus can be enhanced.

In the optical apparatus of an exemplary aspect of the present invention, the holding frame may include a concave frame body which houses the optical modulation element, and a support plate which has the plurality of holes, and which presses and fixes the optical modulation element housed in the concave frame body. The plurality of holes may be burring holes which are provided in such a way that inner peripheral edges of holes formed in the support plate are protruded outwards of a surface of the support plate.

Here, the holding frame may be made a molded article molded by, for example, injection molding, or it may be formed by plate work. In the case, for example, where the holding frame is formed by plate work, the heat radiation characteristics of the optical modulation element can be enhanced, and curtailment in the manufacturing cost of the optical modulation device can be attained.

According to an exemplary aspect of the present invention, the holding frame includes the concave frame body and the support plate, the support plate is formed with the plurality of holes permitting the pins to be inserted therethrough, and the plurality of holes are the burring holes, so that the axial lengthwise dimension of each hole becomes long in essence, and the bonding area between the side surface of each pin and the inner side surface of the corresponding hole can be secured. Accordingly, the inclination of the pin is avoidable in cooperation with the above construction in which at least two of the pins are coupled.

The projector of an exemplary aspect of the present invention includes a light source, the optical apparatus stated above, and a projecting optical device which enlarges and projects an optical image emitted from the optical apparatus.

According to an exemplary aspect of the present invention, the projector includes the optical apparatus stated above, so that it can enjoy the same operations and advantages of those of the above optical apparatus.

The projector includes the optical apparatus which can form a good optical image free from the pixel deviations, so that a clear image can be projected by the projecting optical device.

DETAILED DESCRIPTION OF EXEMPLARY EMBODIMENTS

Now, an exemplary embodiment of the present invention will be described with reference to the drawings.

1 Structure of Projector

Figure 1:
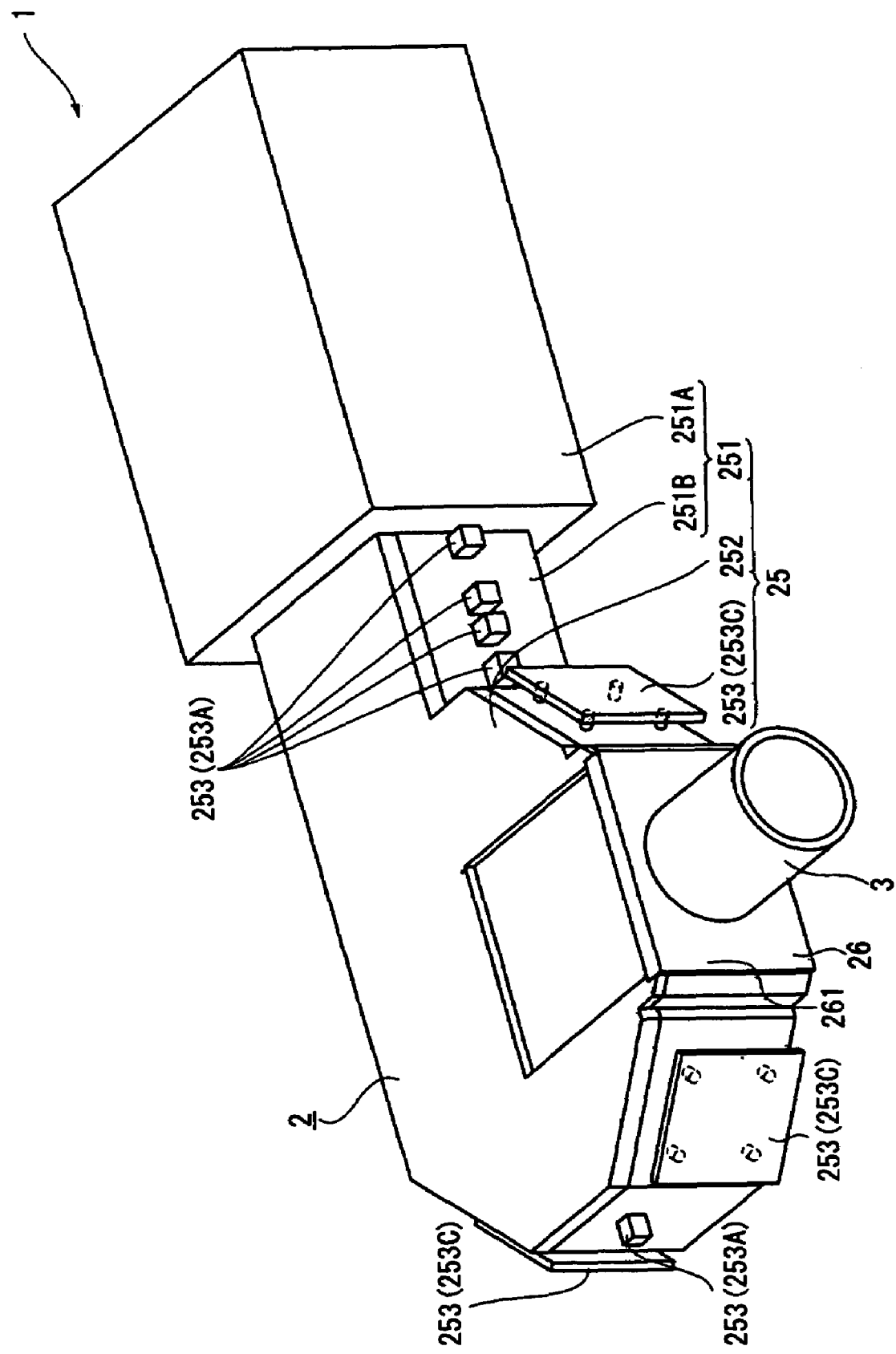
FIG. 1 is a schematic showing the structure of a projector which includes an optical apparatus according to an exemplary embodiment.

FIG. 1 is a schematic showing the structure of a projector 1 which includes an optical apparatus according to this exemplary embodiment.

The projector 1 modulates a light beam emitted from a light source, in accordance with image information, so as to enlarge and project the image information on a projection surface, such as a screen. As shown in FIG. 1, the projector 1 includes an optical unit 2 which is L-shaped when viewed in plan, and a projection lens 3 being a projecting optical device, which is joined with one end of the optical unit 2.

Although concrete illustration is omitted, the projector 1 constructed to include, besides the optical unit 2 and the projection lens 3, a power source unit which offers electric power externally supplied, to the constituent members of the projector 1, a control circuit board which drives and controls the liquid crystal panel of the optical unit 2 as stated later, a cooling unit which has a cooling fan to send cooling air to the constituent members of the projector 1, and so forth.

The optical unit 2 forms an optical image in accordance with external image information, under the control of the control circuit board not shown. As will be concretely stated later, the optical unit 2 includes, as shown in FIG. 1, a light guide 25 which has a lower light guide 251 that is formed in the shape of a container, as well as an upper light guide 252 that closes up the open part of the lower light guide 251, a plurality of optical components which are housed and arranged in the light guide 25, and a head body 26 which is joined with the light guide 25 and which supports the projection lens 3.

The projection lens 3 enlarges and projects the optical image modulated in accordance with the image information by the optical unit 2. The projection lens 3 is constructed as combined lenses which are a plurality of lenses housed in a cylindrical bodytube. It includes a lever, not shown, capable of altering the relative positions of the plurality of lenses, so as to be capable of focus adjustment and magnification adjustment for a projection image.

2 Structure of Optical Unit 2

2-1 Construction of Optical System of Optical Unit 2

Figure 2:
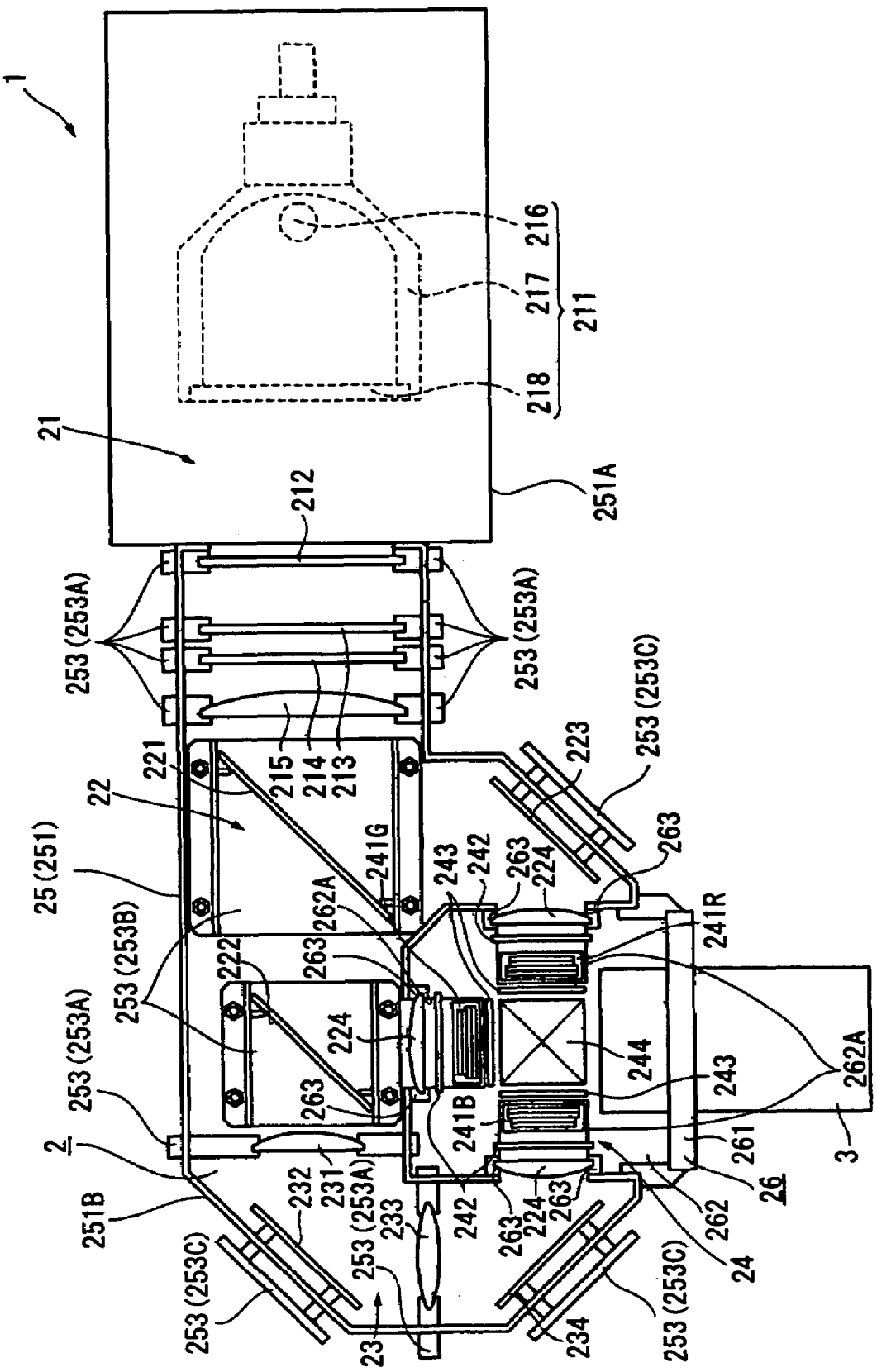
FIG. 2 is a schematic showing the internal structure of an optical unit in the exemplary embodiment.

FIG. 2 is a schematic showing the internal structure of the optical unit 2. FIG. 2 is a view in the case where the upper light guide 252 in the optical unit 2 has been detached.

As shown in FIG. 2, the plurality of optical components housed in the light guide 25 are an integrator illuminating optical system 21, a color separating optical system 22, a relay optical system 23, and the optical apparatus 24 in which optical modulation devices and a color synthesizing optical device are made unitary.

The integrator illuminating optical system 21 is an optical system which serves to uniformalize the intensity of illumination of the light beam emitted from the light source, within a plane orthogonal to an illuminating optical axis. As shown in FIG. 2, the integrator illuminating optical system 21 is constructed including a light source device 211, a first lens array 212, a second lens array 213, a polarization conversion element 214, and a superimpose lens 215.

The light source device 211 includes a light source lamp 216 which is the emission light source, a reflector 217, and an explosion-proof glass 218 which covers the light-beam exit plane of the reflector 217. A radial light beam emitted from the light source lamp 216 is reflected by the reflector 217 into the substantially parallel light beam, which is emitted outside. In this exemplary embodiment, a high-pressure mercury lamp is adopted as the light source lamp 216, while a parabolic mirror is adopted as the reflector 217. The high-pressure mercury lamp is not restrictive as the light source lamp 216. A metal halide lamp or a halogen lamp, for example, may be adopted. Although the parabolic mirror is adopted as the reflector 217, it is not restrictive. A construction in which a paralleling concave lens is arranged on the exit plane of a reflector formed of an elliptic mirror may be adopted.

The first lens array 212 has a construction in which small lenses, each having a substantially rectangular contour as viewed in the direction of the illuminating optical axis, are arrayed in the shape of a matrix. The individual small lenses divide the light beam emitted from the light source lamp 216, into sub-light beams, which are emitted in the direction of the illuminating optical axis.

The second lens array 213 is constructed substantially similar to the first lens array 212, and has a construction in which small lenses are arrayed in the shape of a matrix. The second lens array 213 has a function of focusing the images of the individual small lenses of the first lens array 212 on the image forming regions of the liquid crystal panels 241R, 241G and 241B of the optical apparatus 24 as stated later, in cooperation with the superimpose lens 215.

The polarization conversion element 214 converts the light from the second lens array 213, into a substantially single kind of polarized light, whereby the efficiency of the light in the optical apparatus 24 is heightened.

The individual sub-light beams converted into the substantially single kind of polarized light by the polarization conversion element 214 are substantially superposed on the image forming regions of the liquid crystal panels 241R, 241G and 241B of the optical apparatus 24 as stated later, finally by the superimpose lens 215. In the projector which employs the liquid crystal panels 241R, 241G and 241B of the type that modulate the polarized light, only one kind of polarized light can be utilized, and hence, about half of the light beam from the light source lamp 216 emitting random polarized lights is not utilized. For this reason, the polarization conversion element 214 is employed, whereby the light beam emitted from the light source lamp 216 is converted into the substantially single kind of polarized light, and the efficiency of the light in the optical apparatus 24 is heightened. Such a polarization conversion element 214 is introduced in, for example, JP-A-8-304739.

The color separating optical system 22 includes two dichroic mirrors 221 and 222, and a reflection mirror 223. The plurality of sub-light beams emitted from the integrator illuminating optical system 21 are separated into color lights in the three colors of red (R), green (G) and blue (B) by the two dichroic mirrors 221 and 222.

The relay optical system 23 includes an incident side lens 231, a relay lens 233, and reflection mirrors 232 and 234. The relay optical system 23 has the function of guiding the blue light which is the color light separated by the color separating optical system 22, to the liquid crystal panel 241B of the optical apparatus 24 as stated later.

On this occasion, the dichroic mirror 221 of the color separating optical system 22 transmits therethrough the green light component and blue light component of the light beam emitted from the integrator illuminating optical system 21, and it reflects the red light component therefrom. The red light reflected by the dichroic mirror 221 is reflected by the reflection mirror 223, and it passes through a field lens 224 to reach the liquid crystal panel 241R for the red color. The field lens 224 converts the individual sub-light beams emitted from the second lens array 213, into a light beam parallel to its center axis (principal light rays). The same holds true also of field lenses 224 which are disposed on the light incident sides of the other liquid crystal panels 241G and 241B.

Of the blue light and green light which have been transmitted through the dichroic mirror 221, the green light is reflected by the dichroic mirror 222 and passes through the field lens 224 to reach the liquid crystal panel 241G for the green light. The blue light is transmitted through the dichroic mirror 222, and it passes through the relay optical system 23 and further passes through the field lens 224 to reach the liquid crystal panel 241B for the blue light.

The reason why the relay optical system 23 is employed for the blue light is that, since the optical path length of the blue light is larger than those of the other color lights, the efficiency of the light is prevented from being lowered due to the divergence etc. of the light. That is, the sub-light beams having entered the incident side lens 231 are to be conveyed to the field lens 224 as they are. Although the relay optical system 23 has the construction of passing the blue light of the three color lights therethrough, it is not restricted to this construction, but it may well have a construction of passing, for example, the red light.

The optical apparatus 24 forms a color image by modulating the entered light beams in accordance with the image information. This optical apparatus 24 includes three incident-side polarizer plates 242 into which the respective color lights separated by the color separating optical system 22 are entered, the liquid crystal panels 241R, 241G and 241B which are arranged at stages posterior to the respective incident-side polarizer plates 242, three optical conversion plates 243, and a cross dichroic prism 244 which is the color synthesizing optical device.

The detailed structure of the optical apparatus 24 will be stated later.

2-2 Structure of Light Guide 25

As shown in FIG. 1 or FIG. 2, the light guide 25 includes the lower light guide 251 in which the above optical components 21, 22 and 23 are housed, the upper light guide 252 which closes up the open part of the upper surfaces of the lower light guide 251, and locating members 253 which locate the optical components 21, 22 and 23 except the light source device 211, at the predetermined positions of the lower light guide 251.

Figure 3:
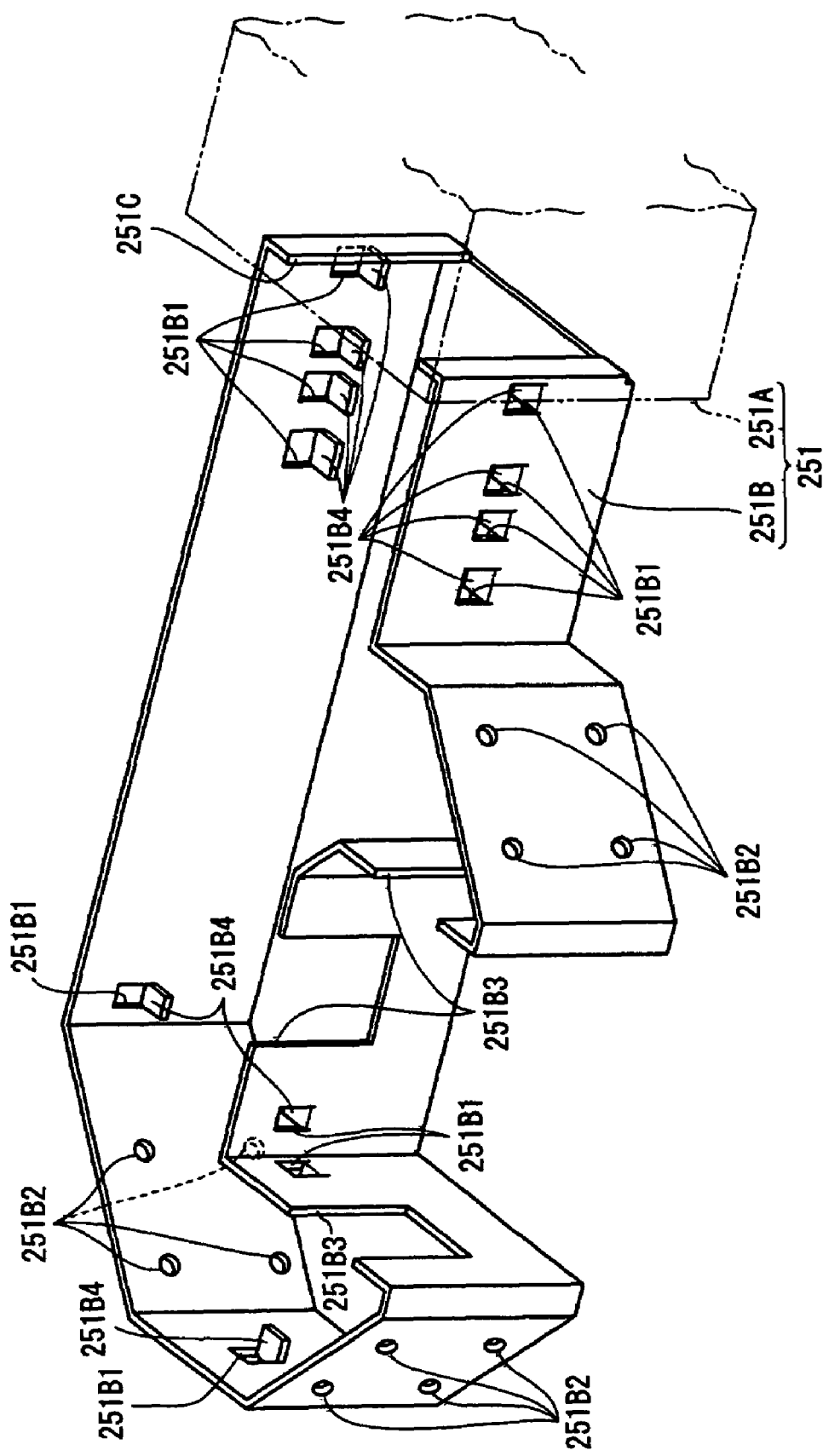
FIG. 3 is a schematic showing the structure of a lower light guide in the exemplary embodiment.

FIG. 3 is a schematic showing the structure of the lower light guide 251.

The lower light guide 251 has been formed by the plate work of a flat plate of aluminum. As shown in FIGS. 1 through 3, it includes a light source housing portion 251A in which the light source device 211 is housed, and a component housing portion 251B in which the optical components 21, 22 and 23 (FIG. 2) other than the light source device 211 are housed. The light source housing portion 251A and the component housing portion 251B are formed into the shape of containers by drawing, and the light source housing portion 251A is open on its lower side, while the component housing portion 251B is open on its upper side. The joint part between the light source housing portion 251A and the component housing portion 251B is formed with an opening 251C (FIG. 3) by cutting or the like so that the light beam emitted from the light source device 211 may pass therethrough.

The light source housing portion 251A and the component housing portion 251B may well be respectively formed by the drawing of a single flat plate. It is also allowed to adopt a construction in which the light source housing portion 251A and the component housing portion 251B are respectively formed by the drawing of two flat plates, whereupon the two members are mechanically joined by screws or the like, or a construction in which the two members are joined by welding.

The light source housing portion 251A has the light source device 211 (FIG. 2) housed and arranged therein through the opening on the lower side, not shown. Although illustration is omitted, the side surfaces of the light source housing portion 251A are formed with slit-like openings by cutting or the like in order that air warmed by heat generated in the light source device 211 may not stay in the light source housing portion 251A.

As shown in FIG. 3, the component housing portion 251B has one end side joined with the light source housing portion 251A, and it has the other end side formed in the shape of the container which is substantially U-shaped when viewed in plan. The head body 26 is joined onto the other end side.

In the component housing portion 251B, its side surfaces are formed with a plurality of holes 251B1 in such a way that parts of these side surfaces are cut inwards of the component housing portion 251B in correspondence with the positions of the optical components 212–215, 231 and 233 (FIG. 2). The side surfaces of the portion 251B are formed with a plurality of circular holes 251B2 penetrating through these side surfaces inwards, in correspondence with the positions of the optical components 223, 232 and 234 (FIG. 2). Further, the side surfaces of the portion 251B on the inner side thereof, as is substantially U-shaped when viewed in plan, are formed with notches 251B3 by cutting or the like in order that the three color lights emitted from the light source device 211 (FIG. 2) and separated by the color separating optical system 22 (FIG. 2) may be permitted to pass toward the optical apparatus 24 (FIG. 2).

In the component housing portion 251B, a plurality of burring holes having threaded grooves are formed in the bottom parts and top parts of this portion though not shown.

As shown in FIG. 1, the upper light guide 252 is a flat plate of aluminum, and it is formed by cutting or the like so as to close up the open part on the upper end side of the component housing portion 251B of the lower light guide 251. The upper light guide 252 is formed with a plurality of holes though illustration is omitted, and it is fixed to the lower light guide 251 by screws or the like through these holes and the burring holes, not shown, formed in the lower light guide 251.

Here, the inner surfaces of the light source housing portion 251A and component housing portion 251B of the above lower light guide 251, and the lower surface of the upper light guide 252 are subjected to a black alumite treatment.

As shown in FIG. 1 or FIG. 2, the locating members 253 include first locating members 253A which locates the first lens array 212, second lens array 213, polarization conversion element 214, superimpose lens 215, incident side lens 231 and relay lens 233, respectively, second locating members 253B (FIG. 2) which locates the dichroic mirrors 221 and 222, respectively, and third locating members 253C which locates the reflection mirrors 223, 232 and 234, respectively. These locating members 253 will be described in the holding structures of the optical components as stated below.

2-3 Holding Structures of Optical Components

Next, there will be described the structures to hold the optical components 21, 22 and 23 except the light source device 211, on the light guide 25.

The holding structures of the optical components can be classified into three sorts of holding structures on the basis of similar structures. Specifically, they can be classified into the holding structures of the lenses to hold the first lens array 212, second lens array 213, polarization conversion element 214, superimpose lens 215, incident side lens 231 and relay lens 233, the holding structures of the dichroic mirrors to hold the dichroic mirrors 221 and 222, and the holding structures of the reflection mirrors to hold the reflection mirrors 223, 232 and 234. The three sorts of holding structures will be successively described below.

2-3-1 Holding Structures of Lenses

Figure 4:
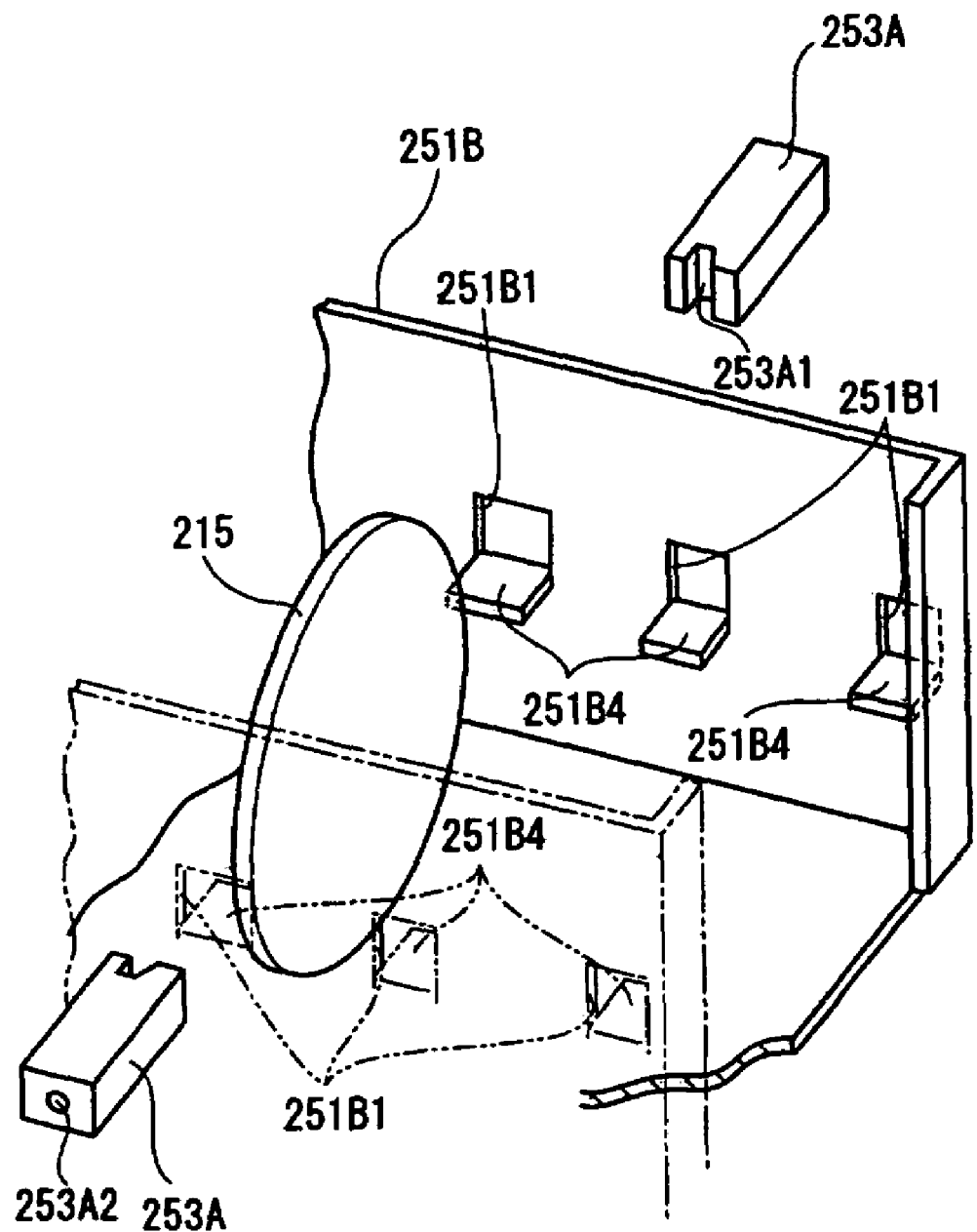
FIG. 4 is a schematic for explaining the holding structure of a lens in the exemplary embodiment.

FIG. 4 is a schematic for explaining the holding structure of the lens. The holding structures of the optical components 212–215, 231 and 233 are similar to the structures as stated above, and the holding structure of the superimpose lens 215 will be described here.

As shown in FIG. 4, the superimpose lens 215 is constructed as a convex lens which is circular when viewed in plan, and the end faces of which on the light-beam incident side and light-beam exit side thereof bulge spherically. Two of the plurality of first locating members 253A stated above are employed as members to hold the superimpose lens 215.

Each of the first locating members 253A is a square pole-shaped member which is inserted through the hole 251B1 formed in the side surface of the lower light guide 251, and it is made of a synthetic resin (acrylic material) which transmits ultraviolet light therethrough. In the first locating member 253A, one end face of the square pole is formed with a recess 253A1 which is substantially V-shaped in section. The recess 253A1 is formed so as to have substantially the same shape as the sectional shape of the outer peripheral end part of the superimpose lens 215.

Here, in the hole 251B1 of the lower light guide 251, apart of the side surface that cut inwards is constructed as a support surface 251B4 for the first locating member 253A.

The first locating members 253A hold the superimpose lens 215 laterally therebetween in such a way that the recesses 253A1 abut on the outer peripheral end parts of the superimpose lens 215 through the holes 251B1 formed in the side surfaces of the lower light guide 251, respectively. On this occasion, an ultraviolet-cure adhesive is filled between the first locating members 253A and the support surfaces 2511B4, and between the recesses 253A1 of the first locating members 253A and the outer peripheral end parts of the superimpose lens 215. The adhesive is hardened by irradiating it with ultraviolet light through the first locating members 253A, whereby the superimpose lens 215 is held on and fixed to the light guide 25.

Each of the holding structures of the other optical components 212–214, 231 and 233 is substantially the same as the above holding structure of the superimpose lens 215.

2-3-2 Holding Structures of Dichroic Mirrors

Figure 5:
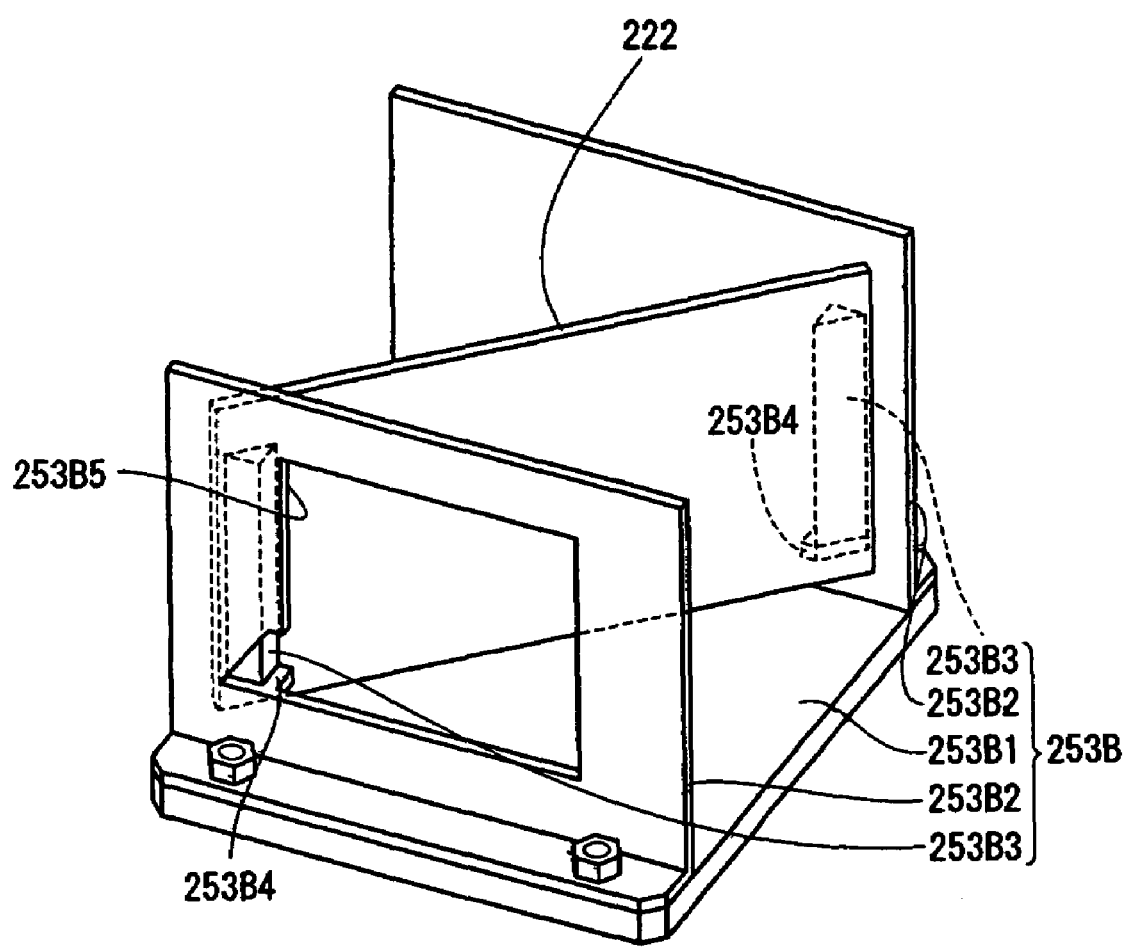
FIG. 5 is a schematic for explaining the holding structure of a dichroic mirror in the exemplary embodiment.

FIG. 5 is a schematic for explaining the holding structure of the dichroic mirror. The holding structures of the dichroic mirrors 221 and 222 are similar structures as stated above, and the holding structure of the dichroic mirror 222 will be described here.

As shown in FIG. 5, the dichroic mirror 222 is rectangular when viewed in plan and is held by the second locating member 253B as stated above.

As shown in FIG. 5, the second locating member 253B includes a plate-like base 253B1 which is fixed to the bottom surface of the component housing portion 251B of the lower light guide 251, a pair of plate-like members 253B2 which are fixed to the upper surface of the base 253B1 and each of which is L-shaped when viewed in section, and spacers 253B3 which are respectively interposed between the pair of plate-like members 253B2 and the right and left side end parts of the dichroic mirror 222.

Each of the pair of plate-like members 253B2 of the constituents has one end surface, that is L-shape in section, fixed to the upper surface of the base 253B1, and the other end surface extends upwards of the base 253B1 and is arranged in opposition to and substantially in parallel with, the side surface of the component housing portion 251B of the lower light guide 251. The dichroic mirror 222 is arranged aslant between the pair of plate-like members 253B2, and the right and left end parts of the dichroic mirror 222 and the other end surfaces of the plate-like members 253B2 are arranged in opposition.

In each of the pair of plate-like members 253B2, the other end surface has a part that is cut in the shape of a triangle toward the opposing plate-like member 253B2, and the cut part is constructed as a support surface 253B4 to support the spacer 253B3.

In that one of the pair of plate-like members 253B2 which lies on the side of the field lens 224 (FIG. 2), the other end surface is formed with an opening 253B5 to pass the G color light reflected by the dichroic mirror 222.

Each of the spacers 253B3 is a triangle pole-shaped member, and it is made of a synthetic resin (acrylic material)

which transmits ultraviolet light therethrough, likewise to the first locating member 253A. In addition, the spacers 253B3 are supported on the support surfaces 253B4, and they are interposed between the right and left end parts of the dichroic mirror 222 and the plate-like members 253B2.

The slanting direction of the oblique surface of the triangle pole of each of the spacers 253B3 is designed so as to become substantially identical to the slanting direction of the dichroic mirror 222. An ultraviolet-cure adhesive is filled between the spacers 253B3 and the support surfaces 253B4, and between the oblique surfaces of the spacers 253B3 and the outer peripheral end parts of the dichroic mirror 222. The adhesive is hardened by irradiating it with ultraviolet light through the spacers 253B3, whereby the dichroic mirror 222 is held on and fixed to the light guide 25.

The holding structure of the dichroic mirror 221 is the same as the above holding structure of the dichroic mirror 222.

2-3-3 Holding Structures of Reflection Mirrors

Figure 6:
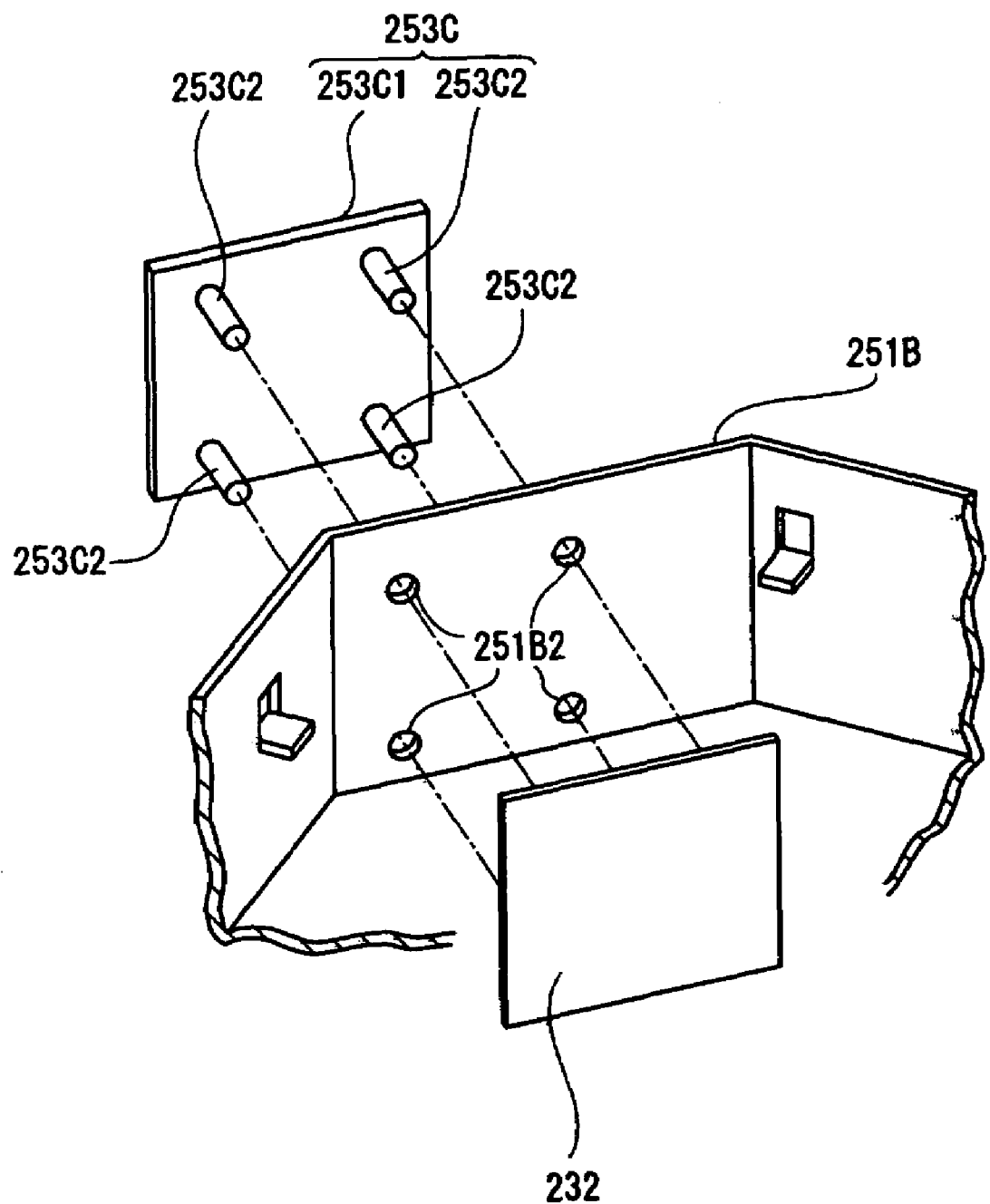
FIG. 6 is a schematic for explaining the holding structure of a reflection mirror in the exemplary embodiment.

FIG. 6 is a schematic for explaining the holding structure of the reflection mirror. The holding structures of the reflection mirrors 223, 232 and 234 are similar to the structures as stated above, and the holding structure of the reflection mirror 232 will be described here.

As shown in FIG. 6, the reflection mirror 232 is rectangular when viewed in plan, and it has a reflection surface on which aluminum or the like of high reflectivity has been evaporated, at one end surface. The third locating member 253C stated above is employed as a member for holding the reflection mirror 232.

The third locating member 253C is made of a synthetic resin (acrylic material) which transmits ultraviolet light therethrough. It includes a plate body 253C1, and four columnar pins 253C2 which protrude from the four corner parts of one end surface of the plate body 253C1 perpendicularly to the end surface.

The third locating member 253C is such that the pins 253C2 are inserted through the holes 2511B2 formed in the side surface of the lower light guide 251, and that the distal ends of the pins 253C2 abut the back surface of the reflection surface of the reflection mirror 232. An ultraviolet-cure adhesive is filled between the pins 253C2 and the back surface of the reflection surface of the reflector mirror 232, and between the outer peripheries of the pins 253C2 and the holes 251B2. The adhesive is hardened by irradiating it with ultraviolet light through the third locating member 253C, whereby the reflection mirror 232 is held on and fixed to the light guide 25.

Each of the holding structures of the other reflection mirrors 223 and 234 is the same as the holding structure of the reflection mirror 232 described above.

Although the first locating members 253A, spacers 253B3 and third locating members 253C described above are made of an acrylic material, they are not restricted thereto, but they may be made of another synthetic resin which transmits ultraviolet light therethrough. Alternatively, they may well be made of optical glass, rock crystal, sapphire, quartz, or the like.

Although any of various adhesives can be adopted as the ultraviolet-cure adhesive for use in the holding structures of the lenses, those of the dichroic mirrors and those of the reflection mirrors, a adhesive whose principal ingredient is acrylate and whose viscosity is 17000 P is favorable.

2-4 Structure of Head Body 26

The head body 26 is made of a magnesium alloy, and is formed into substantially L-shaped side surfaces. As shown in FIG. 2, the head body 26 makes the projection lens 3 and the optical apparatus 24 unitary. The head body 26 includes a lens supporting portion 261 which is formed outside the vertical surfaces of the substantially L-shaped side surfaces, a placing surface 262 which is formed on the upper sides of the horizontal surfaces of the substantially L-shaped side surfaces, and field-lens holding portions 263 which are protrusively provided on the placing surface 262.

The head body 26 is not restricted to the magnesium alloy, but it may be made of a metal, such as aluminum, magnesium, titanium or any alloy containing the element as a principal material.

As shown in FIG. 1 or FIG. 2, the lens supporting portion 261 is formed to be substantially rectangular, and the four corner parts thereof are formed with fixing internal thread holes, not shown, which penetrate through these corner parts and which serve to fix the projection lens 3. The lens supporting portion 261 supports and fixes the projection lens 3 in such a way that screws are brought into threadable engagement with the fixing internal thread holes through the unshown holes of the projection lens 3.

As shown in FIG. 2, the placing surface 262 is formed to be substantially rectangular when viewed in plan. The optical apparatus 24 is placed on and fixed to that part of the placing surface 262 which is substantially central in the lateral direction thereof and which is near the lens supporting portion 261. Four notches 262A which circulate the cooling air sent from the cooling unit, not shown, are formed in those parts of the placing surface 262 which are sideward of the liquid crystal panels 241R, 241G and 241B.

The field-lens holding portions 263 are erected upwards from the corner parts of the notches 262A formed in the placing surface 262, and they hold and fix the field lenses 224.

Above the head body 26, the placing surface 262, for example, is formed with a plurality of holes omitted from illustration, and the head body 26 is fixed to the lower light guide 251 by the screws or the likes through these holes and the burring holes, not shown, formed in the lower light guide 251.

3 Structure of Optical Apparatus 24

Next, the structure of the optical apparatus 24 will be described in detail with reference to FIG. 7 or FIG. 8.

Figure 7:
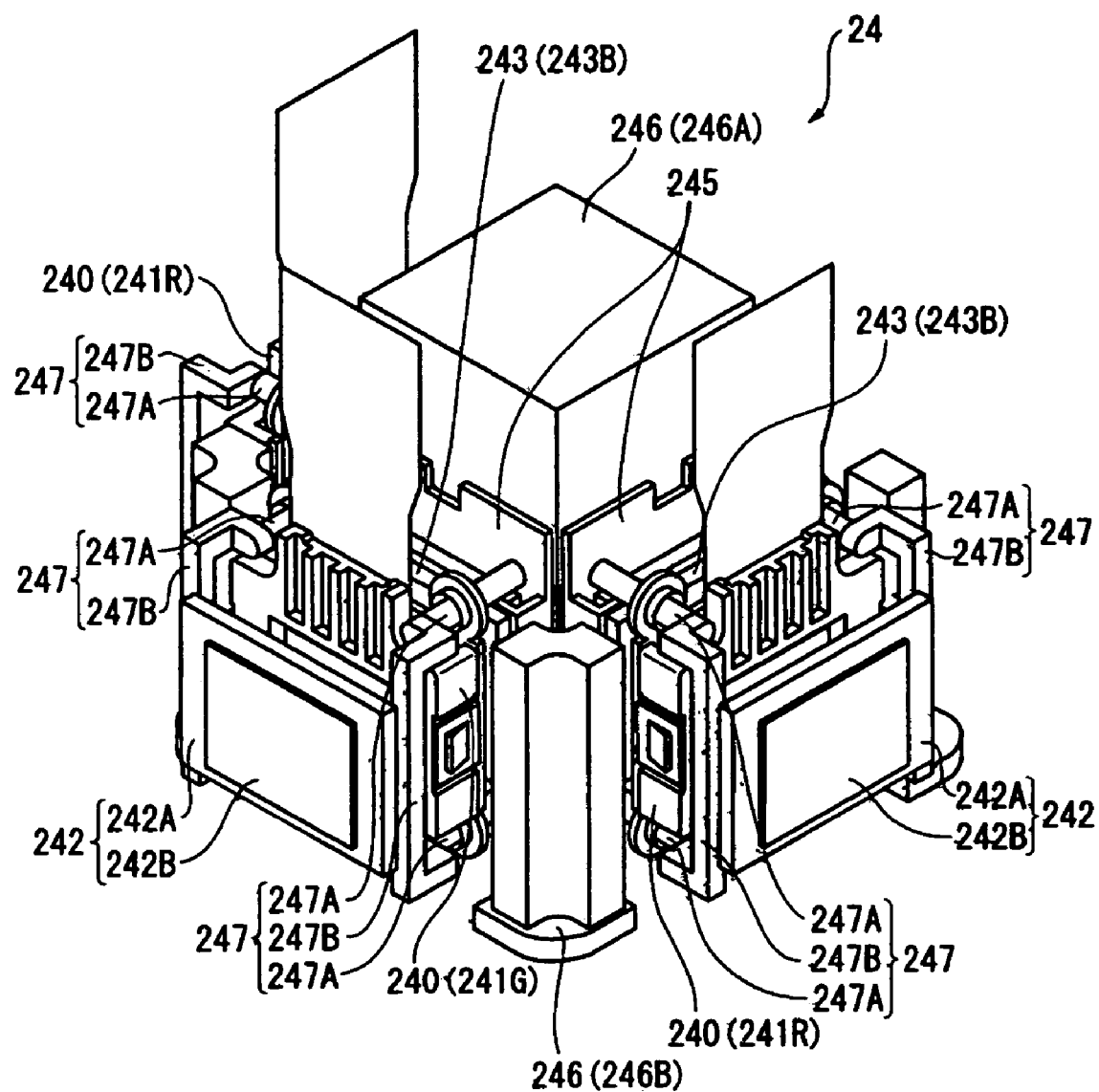
FIG. 7 is a schematic showing the construction of the optical apparatus in the exemplary embodiment.

FIG. 7 is a schematic showing the schematic construction of the optical apparatus 24.

Figure 8:
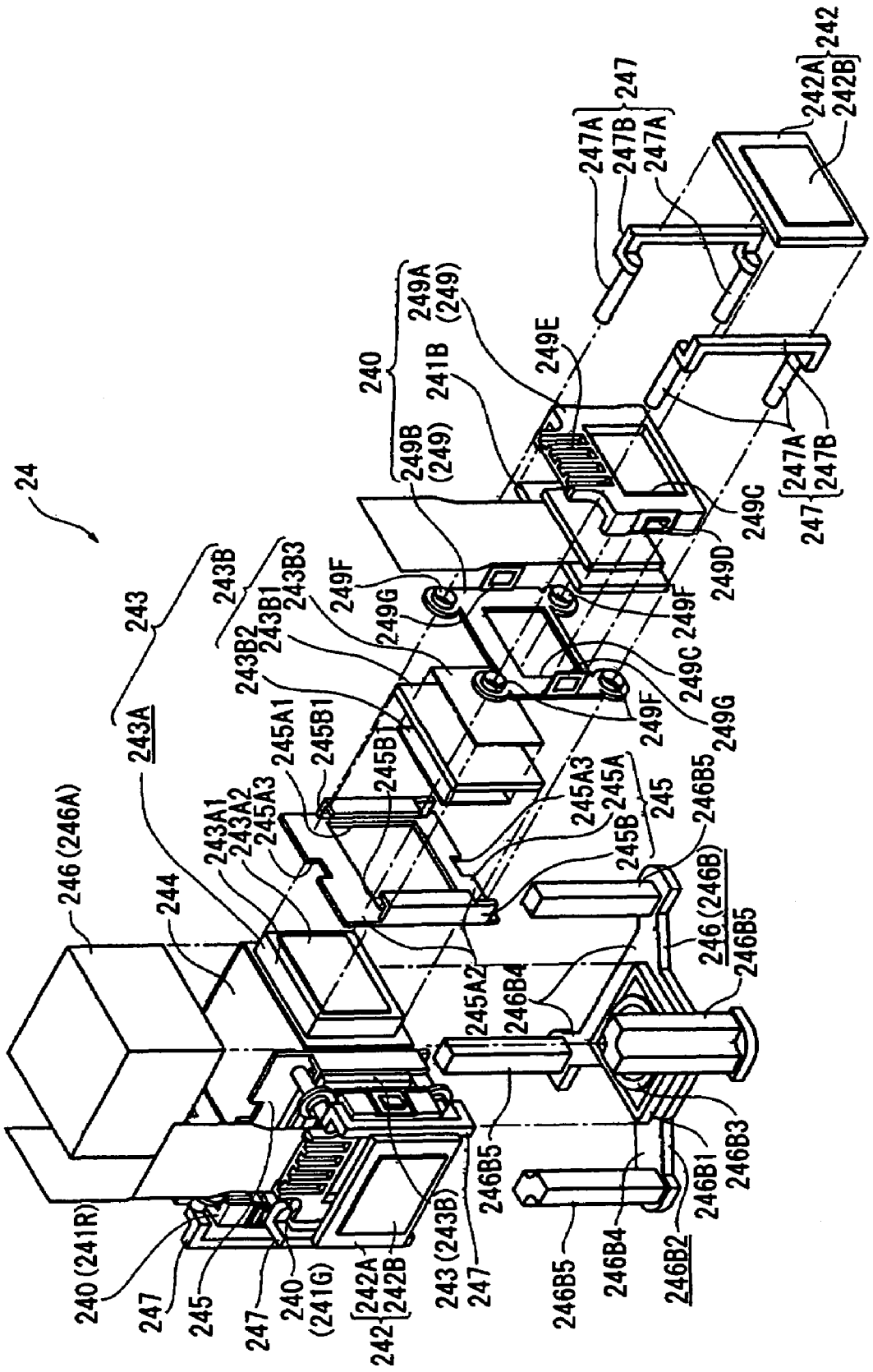
FIG. 8 is a schematic view showing the structure of the optical apparatus in the exemplary embodiment.

FIG. 8 is a schematic showing the structure of the optical apparatus 24. In FIG. 8, only the side of the liquid crystal panel 241B for the B color light is exploded for brevity of description. Each of the sides of the liquid crystal panels 241R and 241G for the R color light and the G color light, respectively, is similarly constructed.

Figure 9:
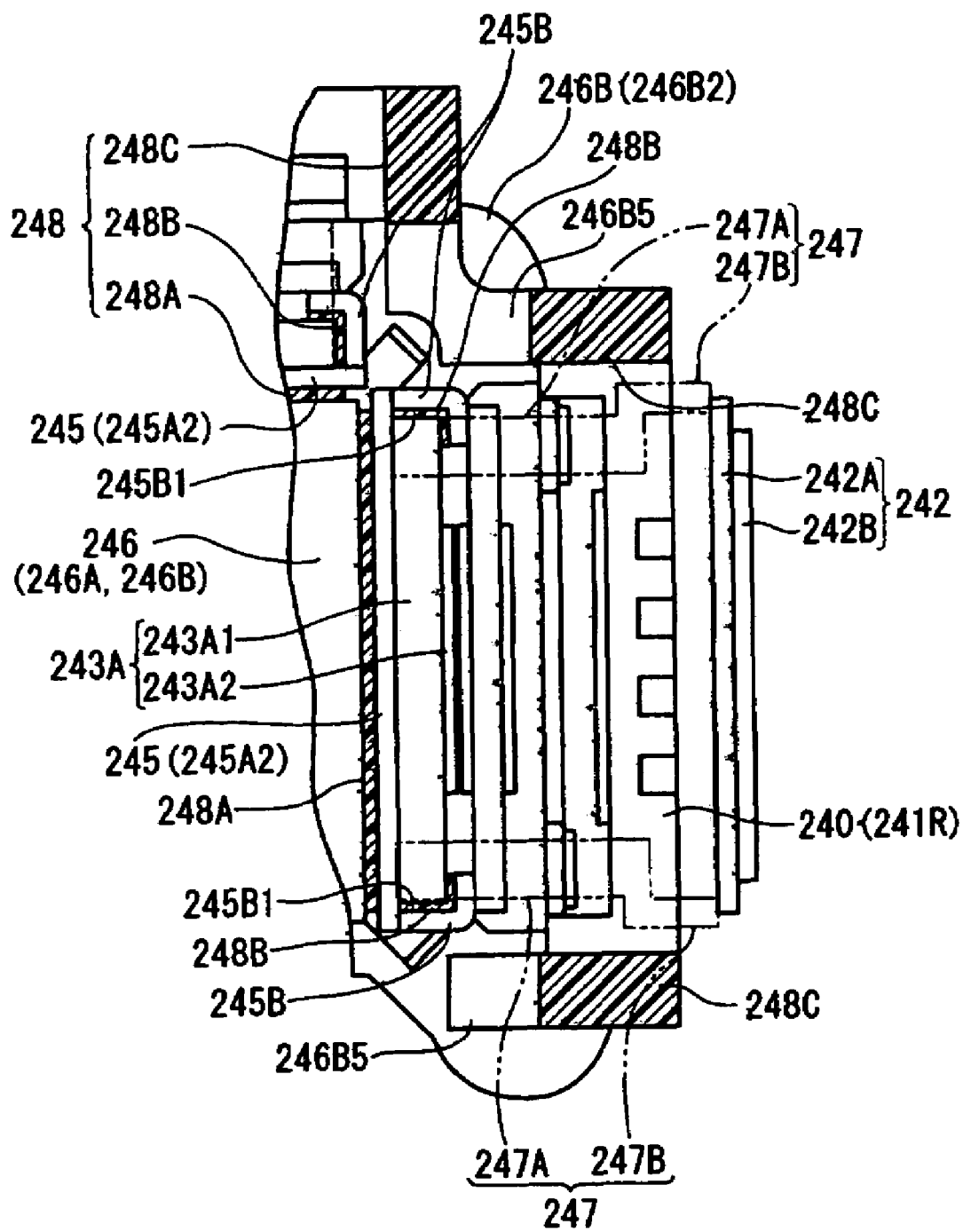
FIG. 9 is a schematic showing the arrangement state of the elastic members of the optical apparatus in the exemplary embodiment.

As shown in FIG. 7 or FIG. 8, the optical apparatus 24 includes the three incident-side polarizer plates 242 which are optical conversion elements, the optical modulation devices 240 which include the liquid crystal panels 241R, 241G and 241B, the three optical conversion plates 243, three heat conduction plates 245, the cross dichroic prism 244 (FIG. 8), bases 246, pin spacers 247, and elastic members 248 (FIG. 9). The optical apparatus 24 is so constructed that the optical components 240, and 242–248 are made unitary as shown in FIG. 7.

As shown in FIG. 7 or FIG. 8, each of the incident side polarizer plates 242 is arranged nearest the light-beam incident side of the optical apparatus 24, and it transmits therethrough only the polarized light of certain direction among the color lights having passed through the color separating optical system 22 and absorbs the other light beams. As shown in FIG. 7 or FIG. 8, the incident side polarizer plate 242 includes a substrate 242A, and a polarization film 242B being an optical conversion film, which is attached on the end surface of the substrate 242A on the light-beam incident side thereof in a state where the polarization axis of this film is set in a predetermined direction.

The substrate 242A is a rectangular plate member, and it can be made of, for example, sapphire glass, rock crystal, quartz or fluorite.

The polarization film 242B is a rectangular film, and it is constructed in such a way that, after iodine is adsorbed by and dispersed in polyvinyl alcohol (PVA) to prepare a filmy material, the filmy material is spread in a certain direction, whereupon acetate cellulose-based films are stacked on both the surfaces of the spread film with a adhesive.

As shown in FIG. 8, each of the optical modulation devices 240 includes the liquid crystal panel 241B (241R or 241G) which is an optical modulation element, and holding frames 249 which hold the liquid crystal panel 241B.

The liquid crystal panel 241B (241R or 241G) employs, for example, polysilicon TFTs as switching elements, and it has a liquid crystal hermetically enclosed between a pair of transparent substrates arranged in opposition. Besides, the liquid crystal panel 241B (241R or 241G) modulates a light beam entered through the incident side polarizer plate 242, in accordance with image information, so as to emit the modulated light beam.

The holding frames 249 include a concave frame body 249A which houses the liquid crystal panel 241B (241R or 241G) therein, and a support plate 249B which comes into engagement with the concave frame body 249A and which presses and fixes the housed liquid crystal panel 241B (241R or 241G). Each of the concave frame body 249A and support plate 249B is provided with an opening 249C at a position which corresponds to the panel surface of the liquid crystal panel 241B (241R or 241G). The liquid crystal panel 241B (241R or 241G) is exposed to the openings 249C, and the exposed part thereof serves as an image forming region. That is, the color light B (R or G) is introduced into this part of the liquid crystal panel 241B (241R or 241G), and an optical image is formed in accordance with the image information.

The concave frame body 249A has a substantially U-shaped section and is provided with an housing portion, not shown, inside the U-shape, and the liquid crystal panel 241B (241R or 241G) is housed in the housing portion. When viewed from the base-end side of the U-shape, the concave frame body 249A is constructed having a lateral widthwise dimension substantially equal to that of the support plate 249B, and a height dimension smaller than that of the support plate 249B, and it is formed so as not to mechanically interfere with the pin spacers 247 by cutting away the right and left corner parts thereof.

In the concave frame body 249A, the outer side surfaces of its U-shaped end edge extending from the base end part thereof are formed with hooks 249D for the engagements with the support plate 249B.

Also, in the concave frame body 249A, the upper side of the end surface on the light-beam incident side is formed with a plurality of fins 249E which extend from the upper end part of this body toward the opening 249C.

The support plate 249B is formed in the shape of a rectangular frame when viewed in plan.

In the support plate 249B, the four corner parts thereof are formed with holes 249F which permit the pin spacers 247 to be inserted therethrough.

Each of the holes 249F is a burring hole which is so formed that its inner peripheral edge protrudes toward the light-beam incident side.

In the support plate 249B, substantially the central parts of its right and left side edges are formed with hook engagement portions 249G which protrude onto the light-beam incident side and which come into engagement with the hooks 249D of the concave frame body 249A. The concave frame body 249A and the support plate 249B are fixed by the engagements between the hooks 249D of the concave frame body 249A and the hook engagement portions 249G of the support plate 249B.

The holding frames 249 stated above can be formed by molding or plate work. The holding frames may be formed for example, from a metal, such as Invar, 42Ni—Fe or the like iron-nickel alloy, a magnesium alloy, an aluminum alloy, carbon steel, brass or stainless steel, or a resin (such as polycarbonate, polyphenylene sulfide, or a liquid crystal resin) in which a carbon filler such as carbon fiber or carbon nanotube is mixed.

Each of the optical conversion plates 243 converts the optical characteristics of the light beam emitted from the corresponding optical modulation device 240. As shown in FIG. 8, the optical conversion plate 243 includes a first optical conversion plate 243A and a second optical conversion plate 243B.

The first optical conversion plate 243A has substantially the same function as that of the incident side polarizer plate 242, and it transmits therethrough only the polarized light of predetermined direction in the light beam emitted from the liquid crystal panel 241B (241R or 241G) and absorbs the other light beam. The polarization axis of the polarized light to be transmitted is set so as to be orthogonal to that of the polarized light to be transmitted through the incident side polarizer plate 242. As shown in FIG. 8, the first optical conversion plate 243A includes a substrate 243A1, and a polarization film 243A2 which is attached on the end surface of the substrate 243A1 on the light-beam incident side thereof in a state where its polarization axis is set in the predetermined direction.

The substrate 243A1 is a rectangular plate member made of rock crystal. This substrate 243A1 has a thermal conductivity of 9.3 W/(m·K) in the direction of its optical axis, and a thermal conductivity of 5.4 W/(m·K) in a direction orthogonal to the optical axis. The substrate 243A1 may be made of sapphire glass, quartz, fluorite or the like apart from the rock crystal.

The polarization film 243A2 is constructed similarly to the polarization film 242B of the incident side polarizer plate 242.

The first optical conversion plate 243A is attached on the end surface of the cross dichroic prism 244 on the light-beam incident side thereof in a state where the optical axis of the substrate 243A1 is set in a predetermined direction. The sticking direction of the first optical conversion plate 243A will be explained simultaneously with the later description of the heat conduction plates 245.

Likewise to the first optical conversion plate 243A, the second optical conversion plate 243B transmits therethrough only the polarized light of predetermined direction in the light beams emitted from the liquid crystal panel 241B (241R or 241G) and absorbs the other light beam. It widens the view angle of the light beam emitted from the liquid crystal panel 241B (241R or 241G). As shown in FIG. 8, the second optical conversion plate 243B includes a substrate 243B1, a polarization film 243B2 which is attached on the end surface of the substrate 243B1 on the light-beam exit side thereof, and a view-angle compensation film 243B3 which is attached on the end surface of the substrate 243B1 on the light-beam incident side thereof.

The substrate 243B1 is similar to the substrate 243A1 stated above. The sticking direction and sticking position of the substrate 243B1 will be explained simultaneously with the later description of the heat conduction plates 245.

Although the polarization film 243B2 is similar to the polarization film 243A2 stated above, it differs in light absorption characteristics from the latter. The polarization film 243B2 is attached on the end surface of the substrate 243B1 on the light-beam exit side thereof in a state where its polarization axis becomes parallel to the polarization film 243A2.

The view-angle compensation film 243B3 compensates for birefringence developing in the liquid crystal panel 241R, 241G or 241B, thereby to correct the view angle of the optical image formed by the liquid crystal panel 241R, 241G or 241B. Owing to the view-angle compensation film 243B3, the view angle of the projection image is widened, and the contrast of the projection image is enhanced.

Each of the heat conduction plates 245 is formed to be substantially rectangular by subjecting a flat plate of aluminum to plate work. The heat conduction plate 245 supports and fixes the second optical conversion plate 243B, and it is joined with the first optical conversion plate 243A so as to be capable of transferring heat, whereby heat from the first optical conversion plate 243A and heat from the second optical conversion plate 243B are permitted to be conducted. As shown in FIG. 8, the heat conduction plate 245 includes a plate-like member 245A, and protrusive portions 245B which protrude from the plate-like member 245A onto the light-beam incident side.

The heat conduction plate 245 may be made of a galvanized steel plate or the like apart from the aluminum plate, and it may be constructed of a molded article which is made of a synthetic resin of high thermal conductivity, Invar or the like, iron-nickel alloy, an Mg alloy, an Al alloy or the like and which is formed by molding, such as injection molding.

In the plate-like member 245A, an opening 245A1 is formed in substantially the central part thereof by cutting or the like. The opening 245A1 is formed to dimensions which are substantially equal to or somewhat larger than the outer dimensions of the substrate 243A1 of the first optical conversion plate 243A, and the substrate 243A1 is fittable into the opening 245A1.

In the plate-like member 245A, the upper and lower end parts thereof serve as sticking portions 245A2, the light-beam exit end surfaces of which are fixed to the side surface of the base 246 so as to be capable of transferring heat. In substantially the central parts of the upper and lower side edges of the respective sticking portions 245A2, notches 245A3 to absorb hot behavior differences are formed toward the opening 245A1.

The protrusive portions 245B lie at the right and left side edges of the opening 245A1 in the plate-like member 245A, and they are parts of plate portions cut outwards to form the opening 245A1. Each of the protrusive portions protrudes onto the light-beam incident side, and its distal end part is bent inwards, whereby it is formed into an L-shape when viewed in section. The protruding dimension of the protrusive portion 245B is made substantially equal to or somewhat larger than the dimension which the first optical conversion plate 243A protrudes from the opening 245A1 of the heat conduction plate 245 in a state where the first optical conversion plate 243A and the heat conduction plate 245 are mounted on the cross dichroic prism 244. The inner end surface of the L-shaped section of each protrusive portion 245B is joined with the first optical conversion plate 243A so as to be capable of transferring heat, thereby to function as a joint surface 245B1. The second optical conversion plate 243B is supported on and fixed to the light-beam incident end surface of the L-shaped section in the protrusive portion 245B.

Here, the first optical conversion plate 243A is attached to the cross dichroic prism 244 so that the optical axis of the substrate 243A1 of the first optical conversion plate 243A may be in a direction in which the protrusive portions 245B of the heat conduction plate 245 oppose to each other, in other words, in a lateral direction.

The second optical conversion plate 243B is supported on and fixed to the protrusive portions 245B of the heat conduction plate 245 so that the optical axis of the substrate 243B1 of the second optical conversion plate 243B may be in the direction in which the protrusive portions 245B of the heat conduction plate 245 oppose to each other, in other words, in the lateral direction.

On this occasion, a state is established where the polarization axis of the polarization film 243A2 in the first optical conversion plate 243A and that of the polarization film 243B2 in the second optical conversion plate 243B are parallel. A state is established where the polarization axes of the polarization films 243A2 and 243B2 are orthogonal to the polarization axis of the polarization film in the incident side polarizer plate 242.

When the first optical conversion plate 243A and the second optical conversion plate 243B are supported as stated above, heat generated in the polarization film 243A2 or 243B2 or the view-angle compensation film 243B3 is transferred to the protrusive portions 245B in that direction of the optical axes in which a comparatively high thermal conductivity is exhibited, so that the heat radiation characteristics of the first optical conversion plate 243A and second optical conversion plate 243B can be enhanced.

The cross dichroic prism 244 forms the color image by synthesizing the optical images which have been emitted from the second optical conversion plates 243 and modulated for the respective color lights. In the cross dichroic prism 244, a dielectric multilayer film which reflects the red light, and a dielectric multilayer film which reflects the blue light are provided substantially in the shape of letter X along the interfaces of four rectangular prisms, and the three color lights are synthesized by the dielectric multilayer films.

The bases 246 are fixed to the upper and lower surfaces (a pair of end surfaces orthogonal to the light-beam incident end surface) of the cross dichroic prism 244. As shown in FIG. 8, the bases 246 include an upper base 246A which is fixed to the upper surface of the cross dichroic prism 244, and a lower base 246B which is fixed to the lower surface of the cross dichroic prism 244.

The upper base 246A is formed substantially in the shape of a rectangular parallelepiped. It has an outer peripheral shape somewhat smaller than that of the cross dichroic prism 244, and is arranged with its side surfaces spaced inside the side surfaces of the cross dichroic prism 244.

The lower base 246B includes a prism fixation plate 246B1 which supports and fixes the lower surface of the cross dichroic prism 244, and a supporter 246B2 which is joined with the prism fixation plate 246B1 and which supports and fixes the whole optical apparatus 24.

The prism fixation plate 246B1 is formed substantially in the shape of a rectangular parallelepiped, the upper surface of which is formed with a spherical bulge 246B3. The cross dichroic prism 244 and the prism fixation plate 246B1 are fixed with an adhesive or the like. Owing to the bulge 246B3, the lower surface of the cross dichroic prism 244 and the prism fixation plate 246B1 come into contact at a point. Accordingly, even in a state where the cutting precision of the four rectangular prisms of the cross dichroic prism 244 is inferior, the cross dichroic prism 244 can be positionally adjusted in three dimensions, and it can be appropriately fixed to the prism fixation plate 246B1.

Although illustration is omitted, the lower surface of the prism fixation plate 246B1 is formed with a locating portion which has locating protrusions, and by which the cross dichroic prism is brought to the predetermined position of the head body 26 (FIG. 1 or FIG. 2).

The supporter 246B2 is a substantially rectangular plate member, the outer dimensions of which are made larger than those of the cross dichroic prism 244. Although illustration is omitted, the supporter 246B2 has an opening to mount the prism fixation plate 246B1, in substantially the central part thereof. The opening has a locating portion to mount the prism fixation plate 246B1 at a predetermined position, and the prism fixation plate 246B1 is mounted at the predetermined position of the supporter 246B2. On this occasion, the lower surface of the prism fixation plate 246B1 is exposed from the opening of the supporter 246B2.

In the supporter 246B2, the four corner parts thereof are respectively formed with extensions 246B4 which extend so as to flare outwards. The upper surfaces of the extensions 246B4 are respectively formed with heat conduction portions 246B5 which extend along the right and left end edges of the holding frames 249 of the optical modulation devices 240 and are joined with these holding frames 249 so as to be capable of transferring heat, in a state where the optical apparatus 24 has been assembled.

The prism fixation plate 246B1 and the supporter 246B2 may be unitarily constructed without being made separate members. It is also allowed to adopt a construction in which the supporter 246B2 and the head body 26 (FIG. 1 or FIG. 2) are unitarily formed without being made the separate members.

The upper base 246A and the lower base 246B are made of a magnesium alloy. The material of the upper base 246A and lower base 246B, however, is not restricted to the magnesium alloy. It is also allowed to employ a material of light weight and good thermal conductivity, for example, a metal, such as Al, Mg or Ti or any alloy thereof, Invar, 42Ni—Fe or the like iron-nickel alloy, carbon steel, brass or stainless steel, or a resin (such as polycarbonate, polyphenylene sulfide, or a liquid crystal resin) in which a carbon filler, such as carbon fiber or carbon nanotube is mixed.

The pin spacers 247 serve to support and fix the optical modulation device 240 on and to the heat conduction plate 245, and they include of two members each of which is formed to be substantially in the shape of letter U when viewed in plan, as shown in FIG. 8.

Each of the pin spacers 247 includes pin-like protrusions 247A being two pins, and a coupler 247B being a coupling portion which couples the two pin-like protrusions 247A. The pin-like protrusions 247A and the coupler 247B are unitarily formed as a molded article which is molded by the injection molding or the like of a synthetic resin (acrylic material) adapted to transmit ultraviolet light therethrough.

Each of the pin-like protrusions 247A has a substantially columnar shape, it is inserted through the hole 249F of the support plate 249B of the holding frame 249 in the optical modulation device 240. One end thereof is fixed to the light-beam incident end surface of the heat conduction plate 245.

The coupler 247B serves to couple the other ends of the two pin-like protrusions 247A. As shown in FIG. 7 or FIG. 8, it extends from the other end parts of the respective pin-like protrusions 247A outwards so as to avoid the optical modulation device 240 in a direction orthogonal to these pin-like protrusions 247A. The end parts of the coupler are bent substantially at 90° so as to extend toward the light-beam incident side in the extending direction of the pin-like protrusions 247A. Further, the end parts are bent substantially at 90° so as to extend downwards or upwards until they are joined with the pin-like protrusions.

Owing to the shape, the coupler 247B is arranged so as to extend in a vertical direction on the light-beam incident side of the optical modulation device 240 as shown in FIG. 7, in the state where the optical apparatus 24 has been assembled. The incident side polarizer plate 242 is attached to the light-beam incident side end surfaces of the couplers 247B so that the light-beam exit side end surface of the substrate 242A may abut on these light-beam incident side end surfaces.

The pin spacers 247 are not restricted to the acrylic material, but they may well be made of another synthetic resin which transmits ultraviolet light therethrough. Alternatively, they may well be made of optical glass, rock crystal, sapphire, quartz, fluorite or the like. Besides, the material which transmits ultraviolet light therethrough is not restrictive, but members of high thermal conductivity, such as of a metal, may well be adopted as the pin spacers 247.

FIG. 9 is a schematic showing the arrangement state of the elastic members 248 in the optical apparatus 24. Specifically, FIG. 9 shows a schematic in which the side of the liquid crystal panel 241R in the optical apparatus 24 is seen from above.

Each of the elastic members 248 is formed of a rubber member whose thermal conductivity is good and which has elasticity, and it is interposed between the constituents. The elastic member 248 joins the constituents so as to be capable of transferring heat. Adoptable as the elastic member 248 is, for example, the rubber member in which powder of aluminum, silver, carbon or the like is mixed. As shown in FIG. 9, the elastic members 248 include a first elastic member 248A, a second elastic member 248B and a third elastic member 248C.

The first elastic members 248A are interposed between the two sticking portions 245A2 of the heat conduction plate 245 and the side surface of the upper base 246A and that of the prism fixation plate 246B 1 in the lower base 246B, whereby they join the heat conduction plate 245 and the base 246 so as to be capable of transferring heat.

The second elastic members 248B are interposed between the joint surfaces 245B1 of the protrusion 245B in the heat conduction plate 245 and the substrate 243A1 of the first optical conversion plate 243A, whereby they join the first optical conversion plate 243A and the heat conduction plate 245 so as to be capable of transferring heat.

In assembling the optical apparatus 24, the heat conduction plate 245 is pressed toward the cross dichroic prism 244, thereby to compress the first elastic members 248A and second elastic members 248B stated above. In this way, the states of close contact of the first elastic members 248A and second elastic members 248B with the corresponding constituents are enhanced, and the heat transfer characteristics between the constituents are enhanced.

The third elastic members 248C are arranged so as to join the heat conduction portion 246B5 of the supporter 246B2 in the lower base 246B and the right and left side surfaces of the holding frame 249 in the optical modulation device 240, whereby they join the optical modulation device 240 and the lower base 246B so as to be capable of transferring heat.

4 Advantages

The optical apparatus 24 includes the two pin spacers 247 in correspondence with each of the light-beam incident side end surfaces of the cross dichroic prism 244, and each of the pin spacers 247 is constructed of the two pin-like protrusions 247A, and the coupler 247B which couples the other ends of the pin-like protrusions 247A on the light-beam incident side thereof. Thus, even in a case where the axial lengthwise dimension of those holes 249F of the optical modulation device 240 through which the pin-like protrusions 247A are inserted is short, the inclinations of the pin-like protrusions 247A attributed to the self-weight of the pin spacer 247 are avoidable when the construction is compared with a construction in which a plurality of pins are formed as respectively separate members as in the related art. Accordingly, since the inclinations of the pin-like protrusions 247A are avoided, the optical apparatus 24 can avoid the positional deviations of the three optical modulation devices 240 among them and can form a good optical image free from pixel deviations.

The two pin-like protrusions 247A are coupled by the coupler 247B at the other ends on the light-beam incident side in the respective pin-like protrusions 247A, so that one end of each pin-like protrusion 247A on the light-beam exit side thereof to support the optical modulation device 240 is bonded and fixed to the light-beam incident side end surface of the heat conduction plate 245. Therefore, the bonding area between each pin-like protrusion 247A to support the optical modulation device 240 and the light-beam incident side end surface of the heat conduction plate 245 becomes comparatively small, influence which is exerted on each pin spacer 247 by thermal stress developing between the members of the pin spacer 247 and the heat conduction plate 245 becomes little, and the positional deviation of each pin spacer 247 is avoidable. Accordingly, since the positional deviations of the pin spacers 247 are avoided, the optical apparatus 24 can avoid the positional deviations of the three optical modulation devices 240 among them and can form a good optical image free from pixel deviations.

The two pin-like protrusions 247A are coupled to each other by the coupler 247B, so that the pin spacer 247 is easily inserted through the holes 249F of the holding frame 249 in the optical modulation device 240, and the optical apparatus 24 can be manufactured with ease, when the construction is compared with a construction in which a plurality of pins are formed as respectively separate members as in the related art.

The coupler 247B couples the other ends of the two pin-like protrusions 247A on the light-beam incident side thereof and lies on the light-beam incident side of the optical modulation device 240, so that in joining and fixing the optical modulation device 240 to the cross dichroic prism 244 through the pin spacers 247, the couplers 247B are pressed onto the side of the cross dichroic prism 244, whereby one end of each pin-like protrusion 247A on the light-beam exit side thereof can be reliably brought into abutment on the light-beam incident side end surface of the heat conduction plate 245. Accordingly, the pin spacers 247 can be reliably bonded and fixed to the heat conduction plate 245, and the joined state of the optical modulation device 240 to the cross dichroic prism 244 can be brought into an appropriate state.

The incident side polarizer plate 242 is attached on the light-beam incident side end surfaces of the couplers 247B, so that any holding member to hold the incident side polarizer plate 242 need not be separately disposed, whereby reduction in the size of the optical apparatus 24 can be attained, and curtailment in the manufacturing cost of the optical apparatus 24 can be attained. Besides, owing to such a construction, in adjusting the mutual positions of the incident side polarizer plate 242 and the optical conversion plate 243, the mere optical apparatus 24 itself can be subjected to the positional adjustments without housing the optical apparatus 24 in the light guide 25, in contrast to, for example, an optical apparatus in which the incident side polarizer plate 242 is not unitarily mounted. Accordingly, the manufacture of the optical apparatus 24 can be carried out more easily.

The coupler 247B couples the two, upper and lower pin-like protrusions 247A and extends in the vertical direction, so that the flow of cooling air is not hindered by the couplers 247B in a case where the cooling air is circulated upwards from below or downwards from above on the light-beam incident end surfaces of the optical apparatus 24. The couplers 247B function as guide portions for the cooling air. Accordingly, air warmed by heat generated in the optical apparatus 24 does not stay in the vicinity of the optical apparatus 24, and fresh cooling air is always sent to the optical apparatus 24, so that the cooling efficiency of the optical apparatus 24 can be enhanced.

The holding frame 249 includes the concave frame body 249A and the support plate 249B, the support plate 249B is formed with the four holes 249F which permit the pin-like protrusions 247A of the pin spacers 247 to be inserted therethrough, and these holes 249F are the burring holes. Thus, the axial lengthwise dimension of each hole 249F becomes long in essence, and the bonding area between the side surface of the pin-like protrusion 247A and the inner side surface of the hole 249F can be secured. Accordingly, the inclination of the pin-like protrusion 247A is avoidable in cooperation with the structure of the pin spacer 247.

The optical apparatus 24 includes the heat conduction plates 245, each of which is joined with the optical conversion plate 243 so as to be capable of transferring heat and is also joined with the side surfaces of the bases 246 fixed to both the upper and lower surfaces of the cross dichroic prism 244, so as to be capable of transferring heat. Thus, heat generated in the optical conversion plate 243 can be radiated to the bases 246 through the heat conduction plate 245. The optical modulation device 240 is joined with the heat conduction portion 246B5 of the lower base 246B through the third elastic member 248C. Thus, heat generated in the optical modulation device 240 can be radiated to the heat conduction portion 246B5. Accordingly, the heat radiation characteristics of the optical conversion plate 243 and optical modulation device 240 can be enhanced, and the cooling efficiency of the optical apparatus 24 can be enhanced. Further, the optical apparatus 24 is placed on and fixed to the metallic head body 26 through the supporter 246B2 of the lower base 246B, and the head body 26 is fixed to the metallic light guide 25. Thus, heat generated in the optical modulation device 240 and the optical conversion plate 243 proceeds to the bases 246, whereupon it is further transferred to the head body 26 and the light guide 25. Accordingly, the heat is not confined in the optical apparatus 24, and the cooling efficiency of the optical apparatus 24 can be enhanced still more.

The sticking portion 245A2 of the heat conduction plate 245 and the side surface of the base 246 are joined by the first elastic member 248A, so that the dimensional changes (expansion and contraction) of the constituents attributed to heat can be absorbed by the first elastic member 248A. Accordingly, the joined states between the heat conduction plates 245 and the bases 246 can be held, and the pixel deviations, etc. are reduced or prevented still further, so that a good optical image can be formed by the optical apparatus 24.

The projector 1 is constructed including the optical apparatus 24 stated above, so that a clear image can be projected on the screen by the projection lens 3.

5 Modifications

Although the present invention has been described above by mentioning the exemplary embodiments, it is not restricted to these embodiments, but it is capable of various enhancements and design alterations within its scope not departing from the purport thereof.

Although, in the foregoing exemplary embodiment, the four holes 249F are formed in the holding frame 249, they are not restrictive, but at least two holes may be formed. The formation positions of the holes 249F are not especially restricted, but they may be in the peripheral edge parts of the opening 249C. The pin-like protrusions 247A constituting the pin spacer 247 may be provided in correspondence with the number of the holes 249F of the holding frame 249.

The foregoing exemplary embodiment has been described on the construction in which the two, upper and lower pin-like protrusions 247A among the four pin-like protrusions 247A are coupled by the coupler 247B, but the construction is not restrictive. It is allowed to employ a construction in which at least two pin-like protrusions 247A are coupled, and it is also allowed to employ, for example, a construction in which three pin-like protrusions 247A among the four pin-like protrusions 247A are coupled, or a construction in which all the four pin-like protrusions 247A are coupled.

The foregoing exemplary embodiment has been described on the construction in which the two, upper and lower pin-like protrusions 247A are coupled by the coupler 247B at the other ends of the respective pin-like protrusions 247A on the light-beam incident sides thereof, but the construction is not restrictive. The pin-like protrusions 247A may well be coupled at any positions thereof except a construction in which the end parts of the respective pin-like protrusions 247A on the light-beam exit sides thereof are coupled to each other.

The construction of the optical apparatus 24 is not restricted to the construction in the foregoing exemplary embodiment. By way of example, it is also allowed to omit the heat conduction plate 245 constituting the optical apparatus 24, and to fix one end each pin-like protrusion 247A on the light-beam exit side thereof to the light-beam incident end surface of the cross dichroic prism 244 or the side surface of the base 246.

Although the foregoing exemplary embodiment has been described on the construction in which the incident side polarizer plate 242 is attached on the light-beam incident side end surface of the coupler 247B in the pin spacer 247, the construction is not restrictive, but another plate, such as a phase difference plate, a color correction plate or a view-angle compensation plate may well be attached.

Although, in the foregoing exemplary embodiment, the holding frame 249 has been constructed of the concave frame body 249A and the support plate 249B, which is formed with the four holes 249F, the construction is not restrictive, but a related-art holding frame in which a concave frame body is formed with holes may well be adopted.

The foregoing exemplary embodiment has been described with reference to the construction in which the supporter 246B2 in the lower base 246B has the heat conduction portion 246B5 and is joined with the holding frame 249 of the optical modulation device 240 through the third elastic member 248C so as to be capable of transferring heat. But the construction is not restrictive. Apart from the optical modulation device 240, the heat conduction portion 246B5 may well be joined with, for example, the right and left side edges of the heat conduction plate 245 so as to be capable of transferring heat. With such a construction, the heat transfer path of the heat conduction plate 245—heat conduction portion 246B5 can be secured, so that the heat radiation characteristics of the first optical conversion plate 243A and the second optical conversion plate 243B can be enhanced still more.

In the foregoing exemplary embodiment, the shape and construction of the light guide 25 are not restricted to the shape and construction stated before. Although there has been exemplified the construction in which the light guide 25 includes the locating member 253 being a solid-state member, and in which the optical components 212–215, 221–223 and 231–234 are fixed to the light guide 25 together with the locating member 253, the construction is not restrictive, but a locating member may well be constructed of, for example, a liquid member. Adoptable as the liquid locating member is, for example, an adhesive, such as photosetting adhesive or thermosetting adhesive. By way of example, the component housing portion 251B of the lower light guide 251, or the upper light guide 252 is formed beforehand with portions which are adapted to abut on the optical components 212–215, 221–223 and 231–234. In addition, the abutment portions are coated with the photosetting adhesive or thermosetting adhesive. The optical components 212–215, 221–223 and 231–234 are caused to abut on the abutment portions, and the positional adjustments of the optical components 212–215, 221–223 and 231–234 are performed with an optical-axis adjustment jig or the like outside the optical apparatus. On this occasion, the optical components 212–215, 221–223 and 231–234 are located at predetermined positions to the light guide 25 by the surface tensions of the photosetting adhesive or thermosetting adhesive. Thereafter, the photosetting adhesive or thermosetting adhesive is set to fix the optical components 212–215, 221–223 and 231–234 to the light guide 25. With such a construction, in the state where the optical components 212–215, 221–223 and 231–234 are housed in the light guide 25, the solid-state locating member 253 can be omitted, so that the weight of the optical unit 2 can be lightened.

In the foregoing exemplary embodiment, only the example of the projector employing the three optical modulation devices has been mentioned, but the present invention is also applicable to a projector employing only one optical modulation device, a projector employing two optical modulation devices, or a projector employing four or more optical modulation devices.

The foregoing exemplary embodiment has employed the optical modulation device of transmission type in which a light incident surface and a light exit surface are different. But it may also employ a light modulation device of reflection type in which a light incident surface and a light exit surface are identical.

In the foregoing exemplary embodiment, only the example of the projector of a front type in which an image is projected from a side where the screen is observed has been mentioned, but the present invention is also applicable to a projector of a rear type in which an image is projected from the opposite side to the screen observing side.

Although exemplary embodiments, etc. for carrying out the present invention have been disclosed in the above statements, the invention is not restricted to the above exemplary embodiments, etc. That is, although the present invention has been particularly illustrated and described concerning chiefly the exemplary embodiments, a person engaged in the art can add various modifications to the foregoing embodiments in shapes, materials, numbers and quantities, and other detailed constructions, without departing from the technical idea of the present invention.

Accordingly, the above-disclosed statements in which the shapes, materials, etc. are restricted have been exemplarily given to facilitate the understanding of the present invention, and they shall not narrowly restrict the invention, so that statements in the appellations of the members with some or all of the restrictions of the shapes, materials, etc. removed shall be covered within the invention.

EXAMPLES

In order to verify the advantages of the present invention, experiments described below were conducted.

In the experiments described below, not only the optical apparatus 24 in the foregoing exemplary embodiment, but also two optical apparatuses differing structurally from the optical apparatus 24 were respectively used.

The experiment using the optical apparatus 24 is named "Example 1", and the experiments using the two optical apparatus differing structurally from the optical apparatus 24 are respectively named "Comparative Example 1" and "Comparative Example 2".

The optical apparatus used in Comparative Example 1 was such that, in the optical apparatus 24 employed in Example 1, the couplers 247B of the pin spacers 247 were omitted, so the four pin-like protrusions 247A were respectively constructed of separate members.

The optical apparatus used in Comparative Example 2 included substantially the same members as the optical modulation devices 240, cross dichroic prism 244 and bases 246 of the optical apparatus 24 employed in Example 1, and also holding members to hold the optical modulation devices, and exit side polarizer plates attached to the light-beam incident end surfaces of the cross dichroic prism.

Among them, each of the holding members was a molded article molded by the injection molding or the like of polycarbonate, it was constructed substantially in the shape of a rectangular plate which had an opening corresponding to the image forming region of the optical modulation device, and the four corner parts thereof were provided with four pin-like protrusions which protrude from the surface of the plate outwards of the surface. The plate surface which was a coupling portion to couple the four pin-like protrusions was bonded and fixed to the light-beam incident end surface of the cross dichroic prism.

In the above example 1 and comparative examples 1 and 2, there were conducted a high-temperature shelf experiment in which the three optical apparatuses were let stand in a high-temperature environment (85° C.) for a long time (72 hours), and a heat-shock experiment in which temperatures were changed over −25° C.–+65° C. in a predetermined environment, and the pixel deviation magnitudes of liquid crystal panels in the respective optical apparatus were compared. Results are indicated in Table 1.

TABLE 1

| | PIXEL DEVIATION MAGNITUDE (μm) | |
|---|---|---|
| | After High-temperature shelf experiment | After Heat-shock experiment |
| Comparative Example 1 | 29.29 | 11.41 |
| Comparative Example 2 | 5.61 | 10.20 |
| Example 1 | 8.42 | 6.00 |

Here, in the measurement of the pixel deviation magnitude, a predetermined pixel position was set as a reference pixel position before each experiment, the predetermined pixel position was measured after the experiment, and the deviation between the measured pixel position and the reference pixel position was calculated as the pixel deviation magnitude.

As the results, Comparative Example 1 exhibited large pixel deviation magnitudes both after the high-temperature shelf experiment and after the heat-shock experiment as indicated in Table 1. When the optical apparatus was checked both after the high-temperature shelf experiment and after the heat-shock experiment, the four pin-like protrusions to support and fix the corresponding optical modulation device inclined relative to a heat conduction plate. The inclinations are considered ascribable to the fact that, in the manufacture of the optical apparatus, the pin-like protrusions were bonded in a state where they were inclined by the self-weights thereof, and the fact that, under the temperature changes in the high-temperature environment or in the predetermined environment, the mutual positions of the three optical modulation devices fixed to a cross dichroic prism deviated due to differences in the magnitudes of thermal expansion arising from differences in the quantities of a adhesive used for bonding the inclined and bonded pin-like protrusions. In Comparative Example 1, such inclinations of the pin-like protrusions incurred the large pixel deviation magnitudes.

In Comparative Example 2, as indicated in Table 1, the pixel deviation magnitude after the high-temperature shelf experiment exhibited a small value, but the pixel deviation magnitude after the heat-shock experiment exhibited a somewhat large value. When the optical apparatus was checked both after the high-temperature shelf experiment and after the heat-shock experiment, the inclinations of the pin-like protrusions noted in Comparative Example 1 were not observed. The large pixel deviation magnitude after the heat-shock experiment is considered ascribable to the fact that, since the coefficients of thermal expansion of each holding member and the cross dichroic prism were different, the thermal stress between these constituents was intensified by the temperature changes in the predetermined environment, so the positions of the holding members fixed to the cross dichroic prism were not favorably kept, and the positions of the optical modulation devices deviated.

In Example 1, when the optical apparatus 24 was checked both after the high-temperature shelf experiment and after the heat-shock experiment, the inclinations of the pin-like protrusions 247A noted in Comparative Example 1 were not observed. As indicated in Table 1, comparatively small pixel deviation magnitudes were exhibited both after the high-temperature shelf experiment and after the heat-shock experiment. These results are considered to be based on the fact that the coupler 247B avoided the inclinations of the pin-like protrusions 247A. Since the pin spacers 247 to support and fix the corresponding optical modulation device 240 had one end of each pin-like protrusion 247A joined with the light-beam incident side end surface of the heat conduction plate 245, the joint area between the pin spacer 247 and the heat conduction plate 245 was small. It is therefore considered that, even when the temperatures were changed in the predetermined environment in the heat-shock experiment, thermal stress developing between the heat conduction plate 245 and the pin spacer 247 exerted little influence on the pin spacer 247, so the positional deviation of the pin spacer 247 could be avoided.

It has accordingly been revealed that, owing to the adoption of the structure of the optical apparatus 24 of an exemplary aspect of the present invention, the positional deviations of the optical modulation devices 240 can be avoided to form a good optical image free from pixel deviations.

What is claimed is:

1. An optical apparatus, comprising:
a plurality of optical modulation devices which modulate a plurality of color lights in accordance with image information for the respective color lights;
a color synthesizing optical device which synthesizes the color lights modulated by the optical modulation devices and then emits the synthesized light, the plurality of optical modulation devices and the color synthesizing optical device being unitarily disposed, each of the optical modulation devices including an optical modulation element which performs optical modulation, and a holding frame which has an opening corresponding to an image forming region of the optical modulation device, and a plurality of holes provided in a peripheral edge of the opening, and which houses the optical modulation device therein;
a plurality of pin spacers each including (i) at least two pins, each of the at least pins being inserted through one of the holes, and (ii) a coupler which connects the at least two pins; and
an optical conversion element, which converts optical characteristics of incident light, attached to the coupler for at least two of the pins,
the plurality of optical modulation devices and the color synthesizing optical device are unitarily constructed so that the coupler is arranged on a light-beam incident side of the optical modulation device.

2. The optical apparatus according to claim 1,
a coupling portion for at least two of the pins of the plurality of pins extending along a flow path of cooling air which is sent to the optical apparatus.

3. The optical apparatus according to claim 1,
the holding frame including a concave frame body which houses the optical modulation element, and a support plate which has a plurality of holes, and which presses and fixes the optical modulation element housed in the concave frame body; and
the plurality of holes being burring holes which are provided in such a way that inner peripheral edges of holes formed the support plate being protruded outwards of a surface of the support plate.

4. A projector, comprising:
a light source;
the optical apparatus according to claim 1; and
a projecting optical device which enlarges and projects an optical image emitted from the optical apparatus.

5. The projector according to claim 4,
a coupling portion for at least two of the pins of the plurality of pins extending along a flow path of cooling air which is sent to the optical apparatus.

6. The projector according to claim 4,
the holding frame including a concave frame body which houses the optical modulation element, and a support plate which has a plurality of holes, and which presses and fixes the optical modulation element housed in the concave frame body; and
the plurality of holes being burring holes which are provided in such a way that inner peripheral edges of holes formed in the support plate are protruded outwards of a surface of the support plate.

7. An optical apparatus, comprising:
a plurality of optical modulation devices which modulate a plurality of color lights in accordance with image information for the respective color lights;
a color synthesizing optical device which synthesizes the color lights modulated by the optical modulation devices and then emits the synthesized light, the plurality of optical modulation devices and the color synthesizing optical device being unitarily disposed, each of the optical modulation devices including an optical modulation element which performs optical modulation, and a holding frame which has an opening corresponding to an image forming region of the optical modulation device, and a plurality of holes provided in a peripheral edge of the opening, and which houses the optical modulation device therein; and
a plurality of pin spacers each including (i) at least two pins, each of the at least pins being inserted through one of the holes, and (ii) a coupler which connects the at least two pins;
the plurality of optical modulation devices and the color synthesizing optical device are unitarily constructed so that the coupler is arranged on a light-beam incident side of the optical modulation device;
the holding frame including a concave frame body which houses the optical modulation element, and a support plate which has a plurality of holes, and which presses and fixes the optical modulation element housed in the concave frame body; and
the plurality of holes being burring holes which are provided in such a way that inner peripheral edges of holes formed in the support plate being protruded outwards of a surface of the support plate.

8. A projector, comprising:
a light source;
the optical apparatus according to claim 7; and
a projecting optical device which enlarges and projects an optical image emitted from the optical apparatus.

* * * * *